United States Patent
Stone

(10) Patent No.: US 9,154,673 B2
(45) Date of Patent: Oct. 6, 2015

(54) CABLE CAMERA SYSTEMS AND METHODS

(71) Applicant: Kenneth Stone, Hillsboro, OR (US)

(72) Inventor: Kenneth Stone, Hillsboro, OR (US)

( * ) Notice: Subject to any disclaimer, the term of this patent is extended or adjusted under 35 U.S.C. 154(b) by 14 days.

(21) Appl. No.: 14/147,794

(22) Filed: Jan. 6, 2014

(65) Prior Publication Data

US 2014/0218603 A1    Aug. 7, 2014

Related U.S. Application Data

(60) Provisional application No. 61/760,581, filed on Feb. 4, 2013.

(51) Int. Cl.
| | |
|---|---|
| H04N 5/225 | (2006.01) |
| G03B 17/56 | (2006.01) |
| F16M 11/00 | (2006.01) |
| H04N 5/232 | (2006.01) |

(52) U.S. Cl.
CPC ............. *H04N 5/2251* (2013.01); *F16M 11/00* (2013.01); *G03B 17/561* (2013.01); *H04N 5/2252* (2013.01); *H04N 5/232* (2013.01)

(58) Field of Classification Search
CPC .. B66F 11/048; G03B 17/561; H04N 5/2251; H04N 5/2252; H04N 5/232
See application file for complete search history.

(56) References Cited

U.S. PATENT DOCUMENTS

| | | | | |
|---|---|---|---|---|
| 5,113,768 A | * | 5/1992 | Brown | 104/112 |
| 5,784,966 A | * | 7/1998 | Brown et al. | 104/304 |
| 2001/0052735 A1 | * | 12/2001 | Sakamoto | 310/75 R |
| 2012/0160122 A1 | * | 6/2012 | Lerner et al. | 104/113 |
| 2013/0104720 A1 | * | 5/2013 | Parker | 83/880 |
| 2013/0205947 A1 | * | 8/2013 | Takahashi | 74/665 B |

FOREIGN PATENT DOCUMENTS

JP    WO2011132324    * 10/2011    ............... B23Q 1/52

OTHER PUBLICATIONS

ZipCam, Cable Camera, Product information at http://www.zipcam.com/.
Summer Gravity Camp, Cable Cam Project, Product information available at http://www.pinkbike.com/forum/listcomments/?threadid=35572&pagenum=8.
Photoship One, FlyLine, Product information available at http://photoshipone.com/flyline-specifications/.
Sea to Sky Cable Cam, Product information available at http://www.seatoskycam.com/services/equipment.
DIY GoPro, DIY GoPro Cable Cam Mount, Product informatin available at http://www.diygopro.com/diy-gopro-cable-cam-mount/.

* cited by examiner

*Primary Examiner* — Christopher K Peterson
(74) *Attorney, Agent, or Firm* — Mohr Intellectual Property Law Solutions, PC

(57) ABSTRACT

The present disclosure is directed to a camera transport device for movingly supporting a camera from a suspension line and various example cable camera systems. In some examples, the camera transport device includes a cart module, a motor transportation module, a pan/tilt module including a panning assembly and a tilting assembly, and at least one gear train configured to drive rotation of the panning assembly and pivot of the tilting assembly. In some further examples, the camera transport device selectively includes one of an open configuration cart or a closed configuration cart for engaging with the suspension line.

20 Claims, 19 Drawing Sheets

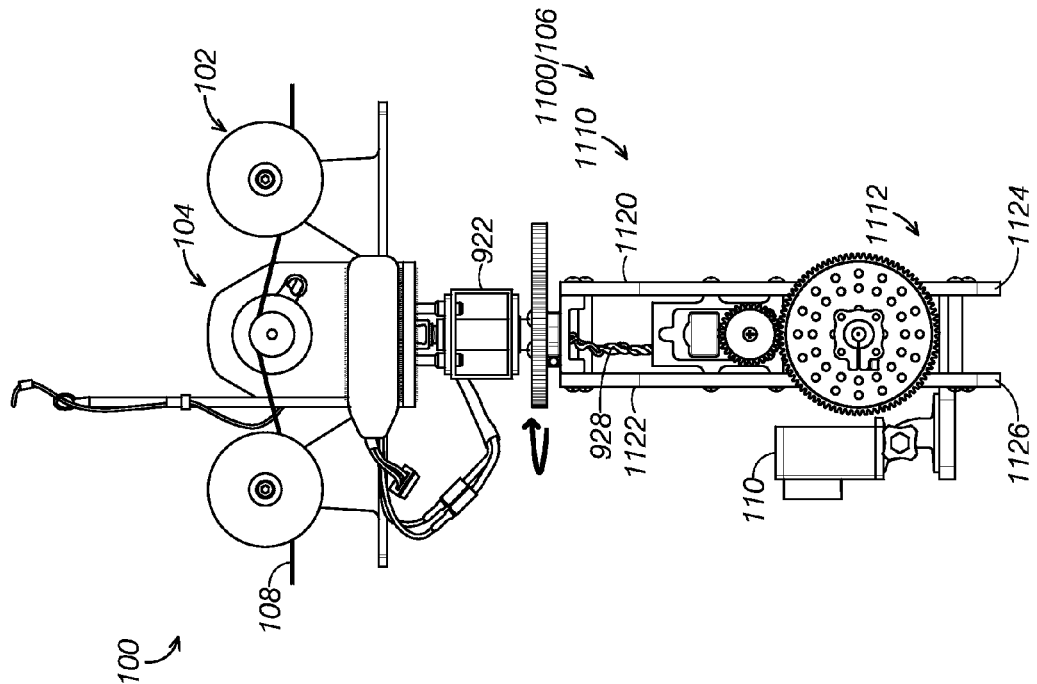
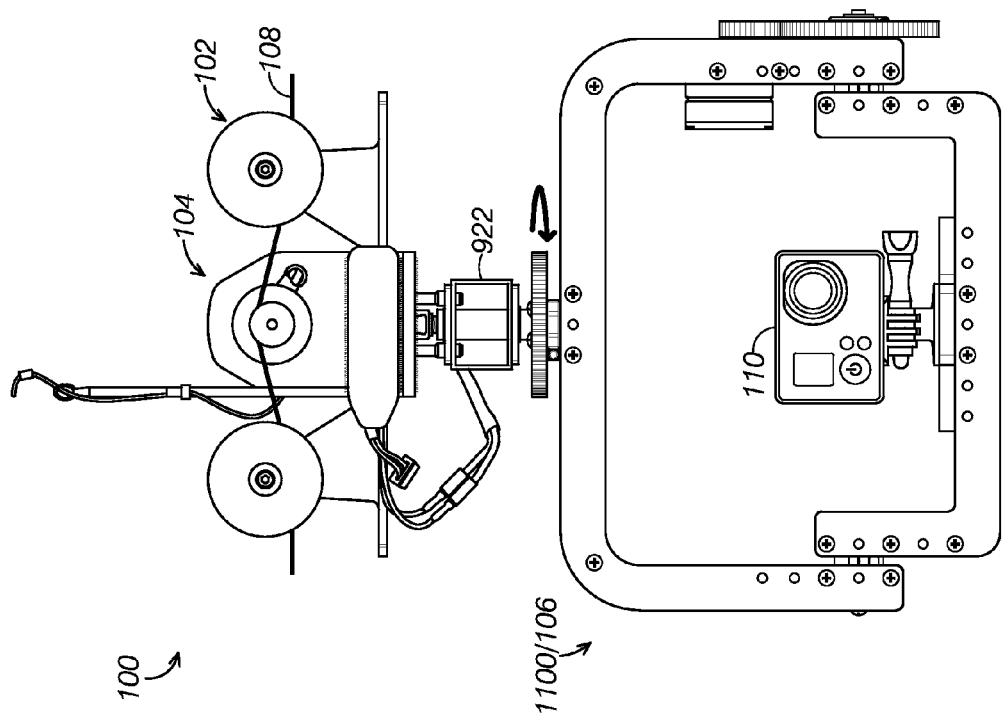
FIG.15B
FIG.15A

CABLE CAMERA SYSTEMS AND METHODS

CROSS REFERENCE TO RELATED APPLICATIONS

This application claims priority to U.S. Provisional Patent Application Ser. No. 61/760,581, filed on Feb. 4, 2013, which is hereby incorporated by reference for all purposes.

BACKGROUND

The present disclosure relates generally to cable camera systems and methods for their use. In particular, cable camera systems that use lightweight, easy-loading, and affordable modular components are described.

Capturing compelling video with video cameras is a hobby for some and a profession for others. There are a variety of techniques to create different creative and interesting visual effects. The visual effects can reflect the videographer's artistic vision, provide a thrilling experience to people viewing the visual effect, and convey information, including advertising information, more effectively.

One videography technique is known as the cable camera technique. The cable camera technique involves suspending a camera from a cable that extends between supports. Often, cable camera systems will include a carriage or cart suspended from the cable on wheels and the camera will be secured to the carriage or cart. When the camera is oriented in line with the cable, the visual effect created is a sensation of fast, first person motion as the person viewing the visual effect naturally subsumes the camera's view as his own and sees the scenery around the camera quickly moving relative to the camera. When the camera is oriented transverse to the cable, typically on a subject moving parallel to the cable at the same speed the camera is moving down the cable, the visual effect created is a steady view of the subject and a sensation of speed as the scenery moves past the subject.

Professional cable camera systems include parallel laid cables with a large carriage or cart that is motor driven. Operation of the camera and the cart is carried out remotely, often by multiple operators. Alternatively, hobbyist cable camera systems require that cable be extended between supports in a declined orientation. When the camera released, it moves down the cable under the force of gravity with little to no control over orientation and speed of the cart after the camera is released.

Existing professional motion picture cameras and cable camera setups are expensive, in the range of thousands to tens of thousands of dollars. In addition to being expensive, the camera systems used by movie companies have complex cable camera systems that are very robust and require actual cable, such as Kevlar fiber optic cables capable of supporting up to 272 Kg, to support them. The expense and complexity of conventional professional cable camera systems puts them out of reach for most hobbyist videographers.

Existing hobbyist cable camera systems are often homemade and do not provide smooth and predictable capturing of motion picture or videos of moving objects or the view from a moving object. Additionally, the gravity driven method for camera movement gives the videographer little control over the speed of the car and direction of the camera, and does not allow change of speed of the car or direction of the camera during operation. Thus, hobbyist cameras provide only a fraction of the possible artistic video capture effects that a professional system provides.

Further, both conventional professional and hobbyist cable camera systems are not convenient to deploy. For example, conventional cable camera systems include heavy components. If a string or finer gauge cable were used with these existing cable cams, the cams would not be structurally sound. Furthermore, known cable camera systems typically include a cart with a closed circle frame design, which includes two lateral supports. The closed circle frame design requires that a user take off the wheels of the car to position the cable underneath the wheels or thread the cable through the car, neither of which are convenient to do when in the field.

Thus, there exists a need for cable camera systems that improve upon and advance the design of known cable camera systems. Examples of new and useful cable camera systems and methods relevant to the needs existing in the field are discussed below.

SUMMARY

The present disclosure is directed to a camera transport device for movingly supporting a camera from a suspension line and various example cable camera systems. In some examples, the camera transport device includes a cart module, a motor transportation module, a pan/tilt module including a panning assembly and a tilting assembly, and at least one gear train configured to drive rotation of the panning assembly and pivot of the tilting assembly. In some further examples, the camera transport device selectively includes one of an open configuration cart or a closed configuration cart for engaging with the suspension line.

BRIEF DESCRIPTION OF THE DRAWINGS

FIGS. 15A and 15B are side views of the first example cable camera system, the camera positioned along the longitudinal axis of the system and the lateral axis of the system, respectively.

DETAILED DESCRIPTION

Figure 1:
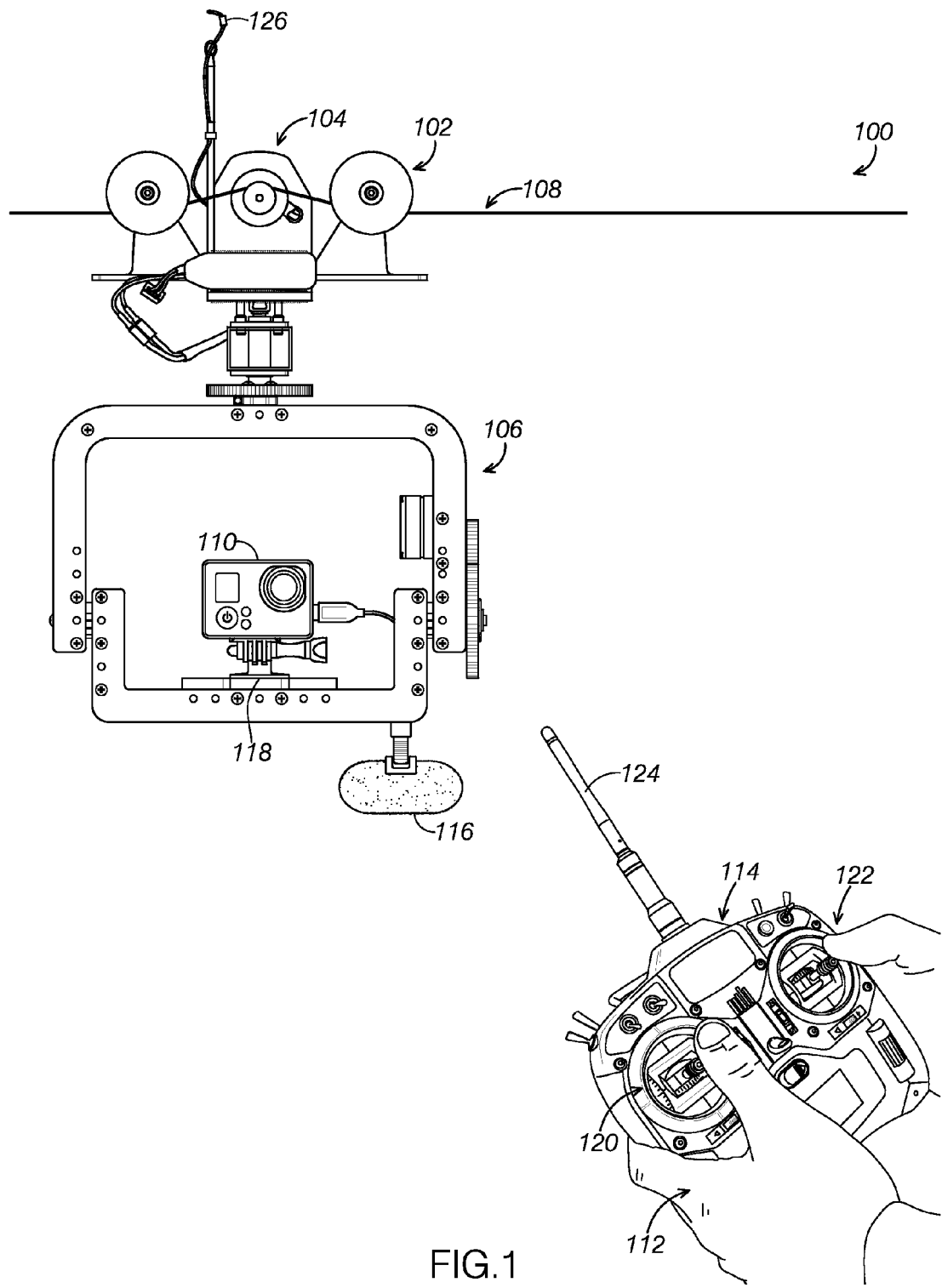
FIG. 1 is a perspective view of a first example cable camera system.

The disclosed cable camera systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various cable camera systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-19C, a first example of a cable camera system, cable camera system 100, will now be described. Cable camera system 100 includes a cart module 102, a motor transportation module 104, and a pan/tilt module 106, which form a camera transport device for movingly supporting a camera from a suspension line. Cable camera system 100 is engaged with/loaded onto a line 108. A camera 110 is releasably mounted to pan/tilt module 106.

Movement of cable camera system 100 is remotely controlled by a user 112 via remote control 114. Cable camera system 100 may be used by hobbyist and/or professional videographers to record video using the cable camera technique to create desired visual effects without the expensive and cumbersome components of a professional cable camera system. Further, cable camera system 100 includes modular components that can be selectively used depending on the desires of the user and/or video capturing conditions.

Cable camera system 100 has the advantage that, because the system can include an open configuration cart 200 (depicted in FIGS. 2A-3B and 8A-10), it may be easily loaded onto the line with one hand. In other words, cable camera system 100 can be a single-handed loadable system. Thus, cable camera system 100 can be used in environments where quick loading is desirable (e.g., fast paced sporting events such as soccer, BMX biking, and skate boarding) and/or in environments where a user only has a single hand free (e.g., extreme sports such as mountain climbing).

Cable camera system 100 has the additional advantage that, because the system can include a closed configuration cart 400 (depicted in FIGS. 4A-6), it may capture a line between the cart wheels and the walls of the cart. In other words, cable camera system 400 is a two-handed loadable system which encompasses the line and is securely attached to the line. Thus, cable camera system 400 can be used in environments where secure attachment to the line is desirable (e.g., outdoor environments where the system is suspended high in the air or in windy conditions) and/or when used by a less experienced operator (e.g., use by a child).

Figure 7A:
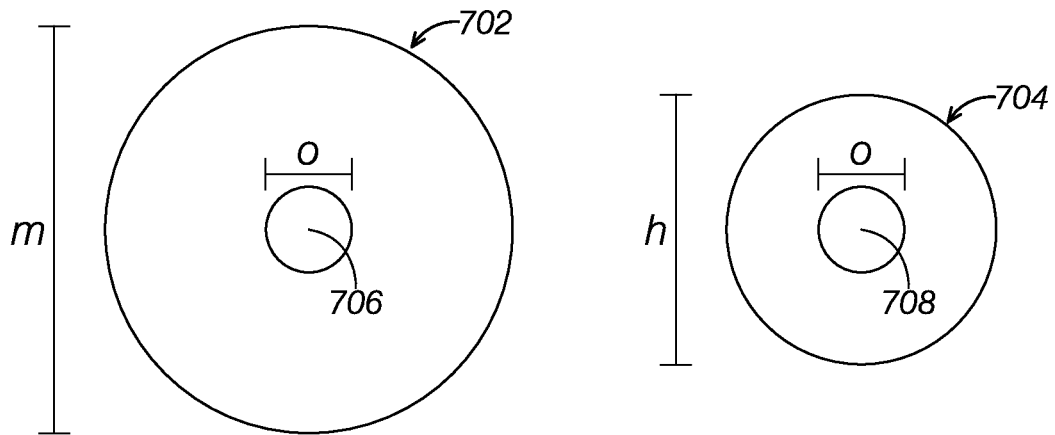
FIGS. 7A and 7B are top and side views, respectively, of a larger fly wheel and a smaller fly wheel.
Figure 7B:
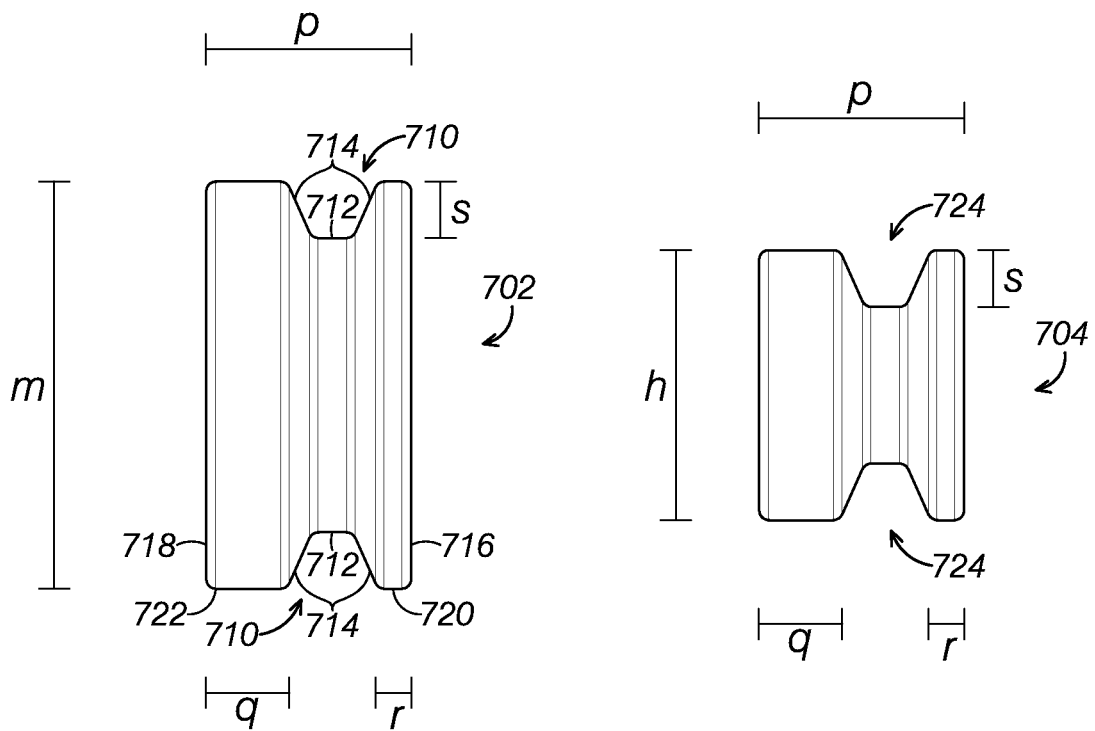

FIGS. 7A and 7B show example fly wheels 702 and 704 that may be used in combination with either of open configuration cart 200 and closed configuration cart 400. Fly wheel 702 is a larger fly wheel, while fly wheel 704 is a smaller fly wheel. For illustrative purposes, fly wheel 702 is shown in combination with open configuration cart 200 in FIGS. 8A and 8B.

The fly wheel is rotatably coupled to the motor transportation module to drive forward and backward movement of cable camera system 100. A size of the fly wheel may be adjusted in order to adjust a speed capacity of the cable camera system depending on video capture conditions (e.g., faster speed capacity for sporting event video capture, slower speed capacity for dramatic scene video capture, etc.). For example, a larger fly wheel can be used to give the cable camera system a greater speed capacity. In another example, a smaller fly wheel can be used to give the cable camera system a decreased speed capacity.

Figure 9:
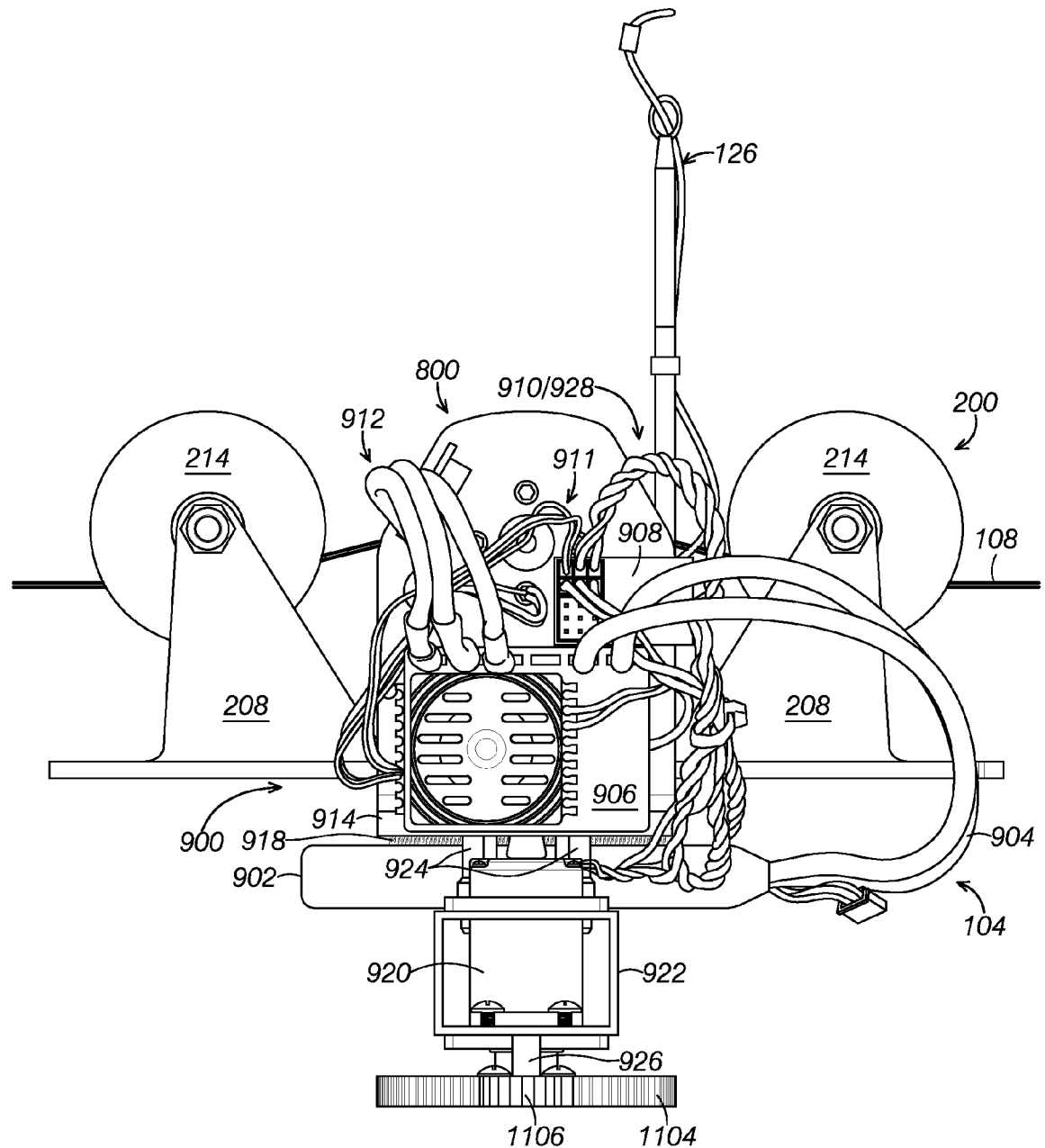
FIG. 9 is a side view of a motor transportation module releasably fixed to the open configuration cart.
Figure 10:
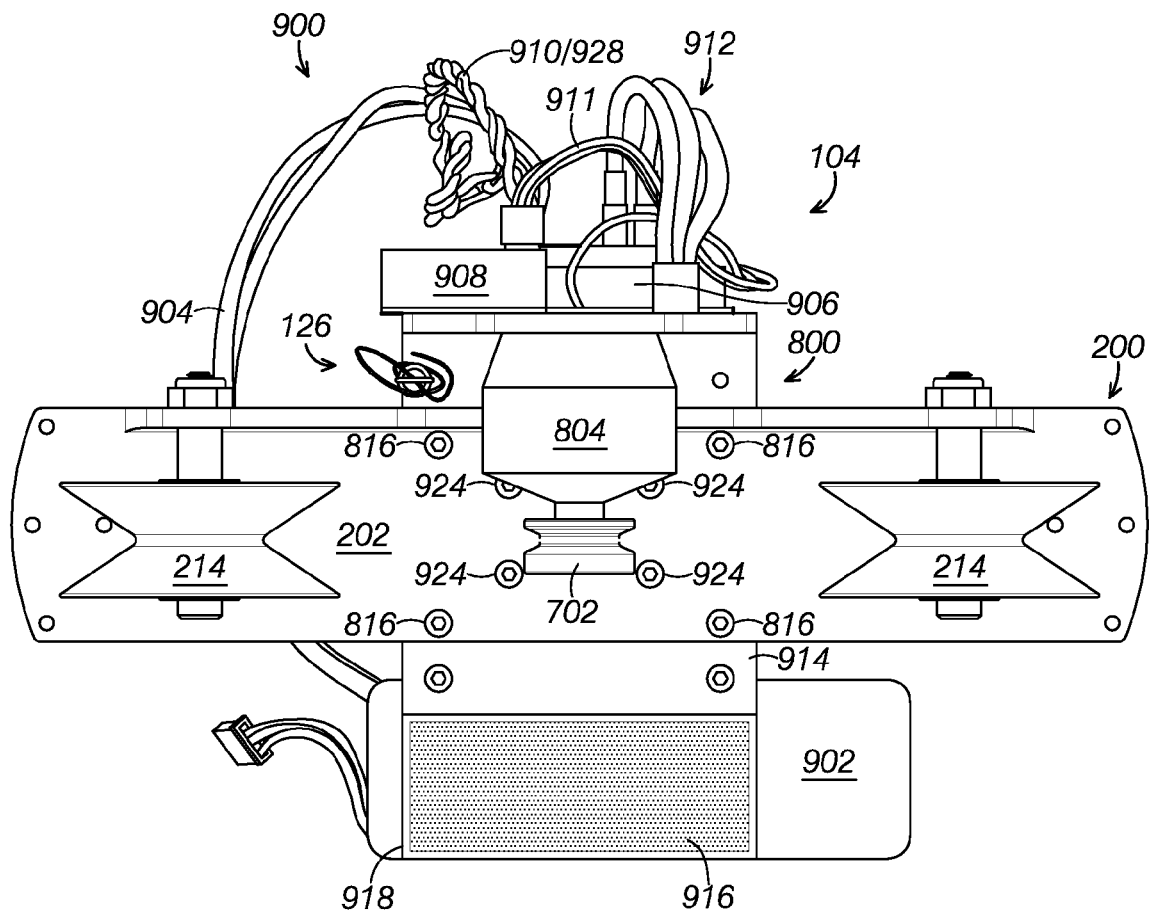
FIG. 10 is a top view of the motor transportation module releasably fixed to the open configuration cart.
Figure 11:
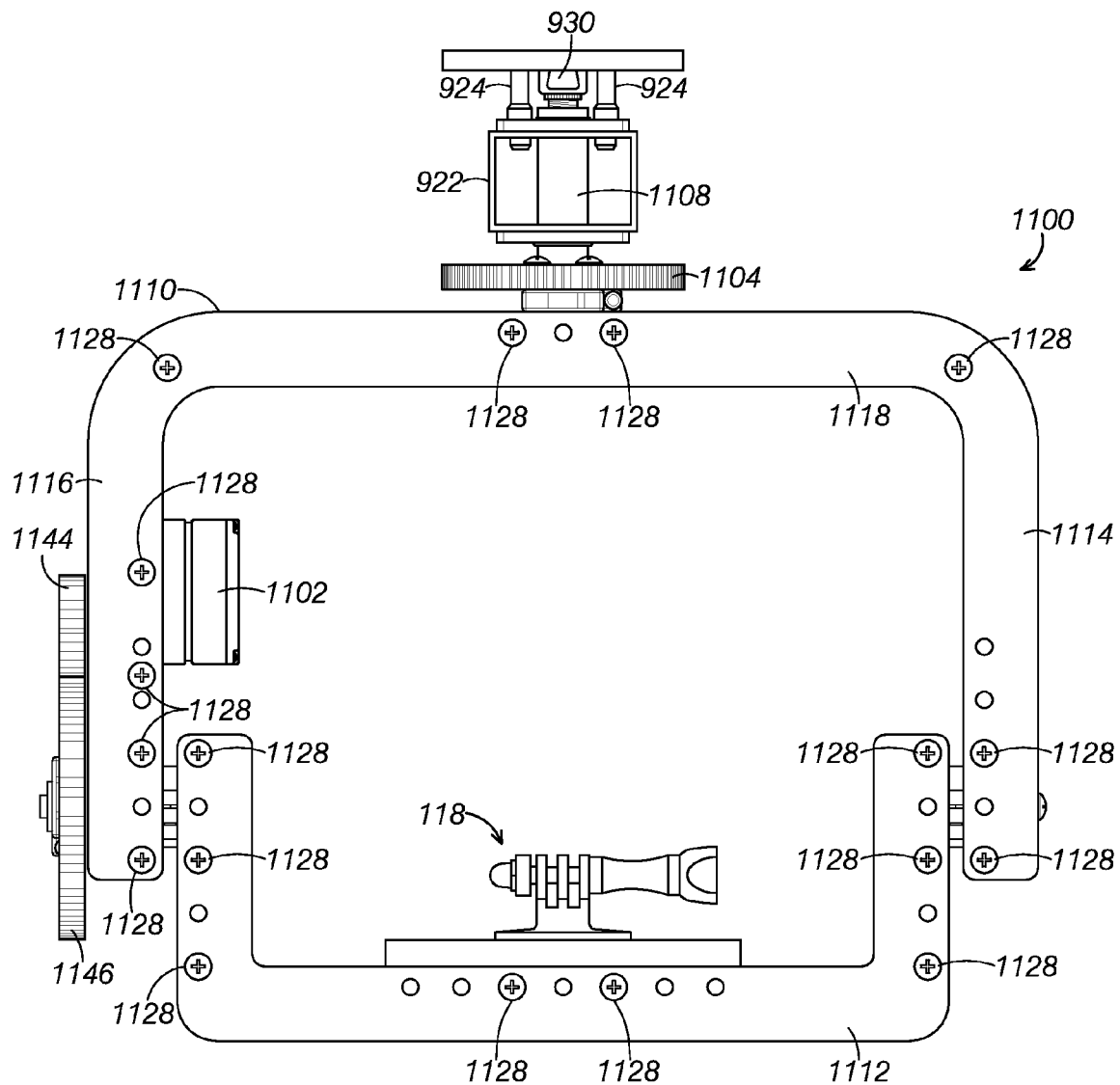
FIG. 11 is a side view of a first example pan/tilt module.

FIGS. 9 and 10 are views of motor transportation module 104 that is used in cable camera system 100 with either of open configuration cart 200 or closed configuration cart 400. For illustrative purposes, the motor transportation module is shown in combination with open configuration cart 200. The motor transportation module is in wireless communication with remote control 114 and is configured to drive movement of the cable camera system (e.g., forward and backward movement over the line, panning, tilting, etc.) based on instructions received from the remote control.

Figure 16:
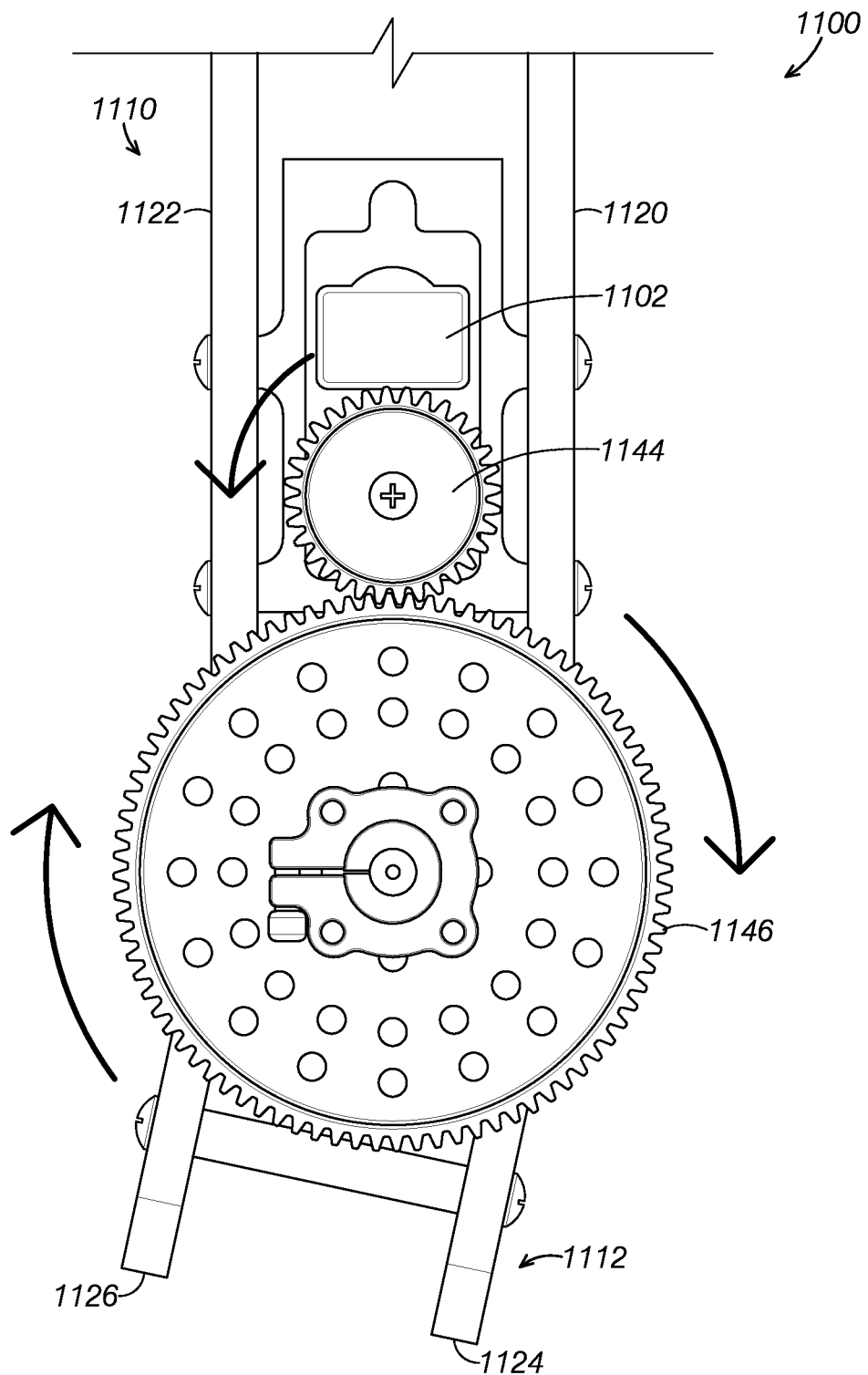
FIG. 16 is a rear view of the tilt motion control portion pan/tilt module tilted in a lateral direction relative to the pan/tilt module.
Figures 17A, 17B:
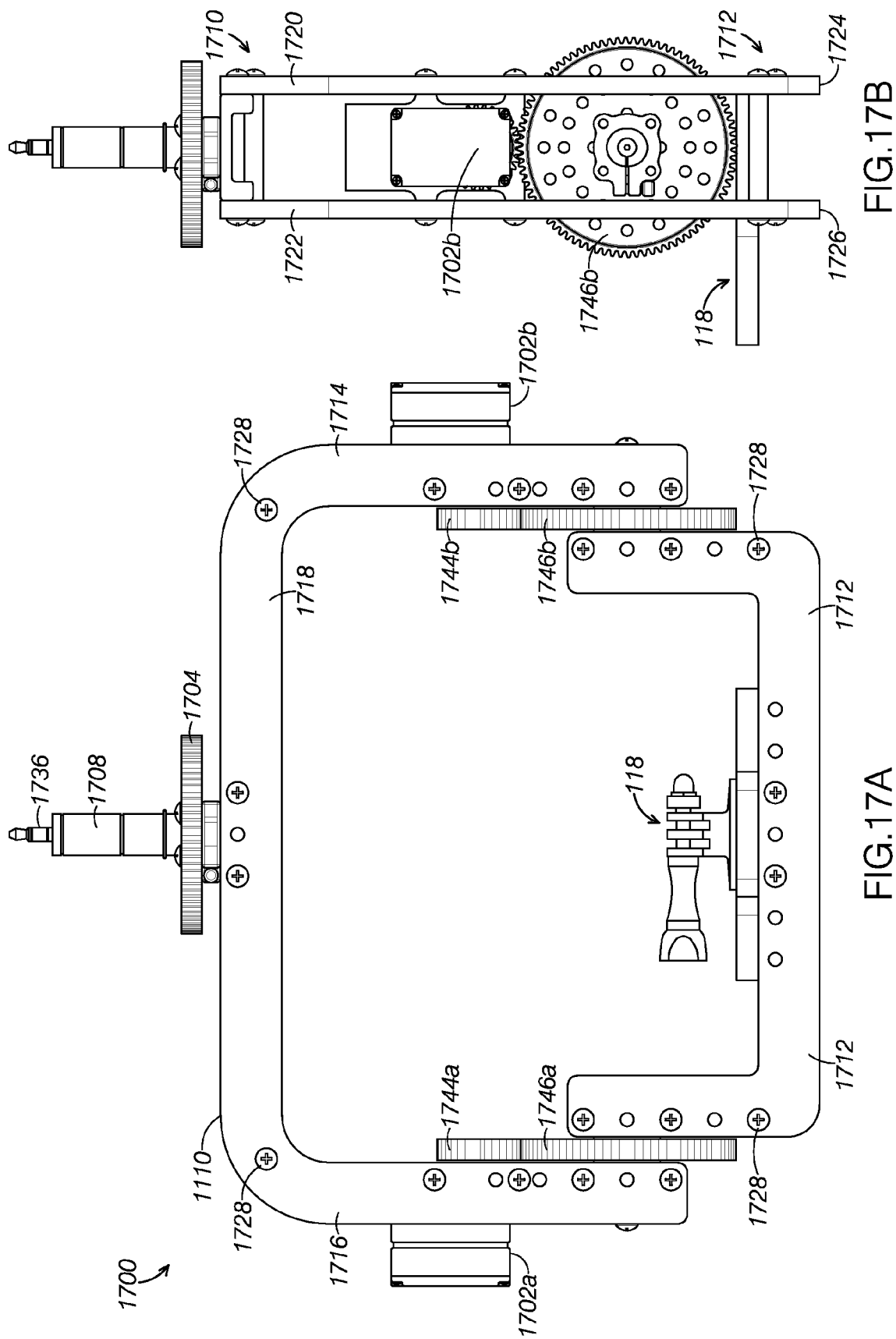
FIGS. 17A and 17B are side and rear view of a second example pan/tilt module.
Figure 18:
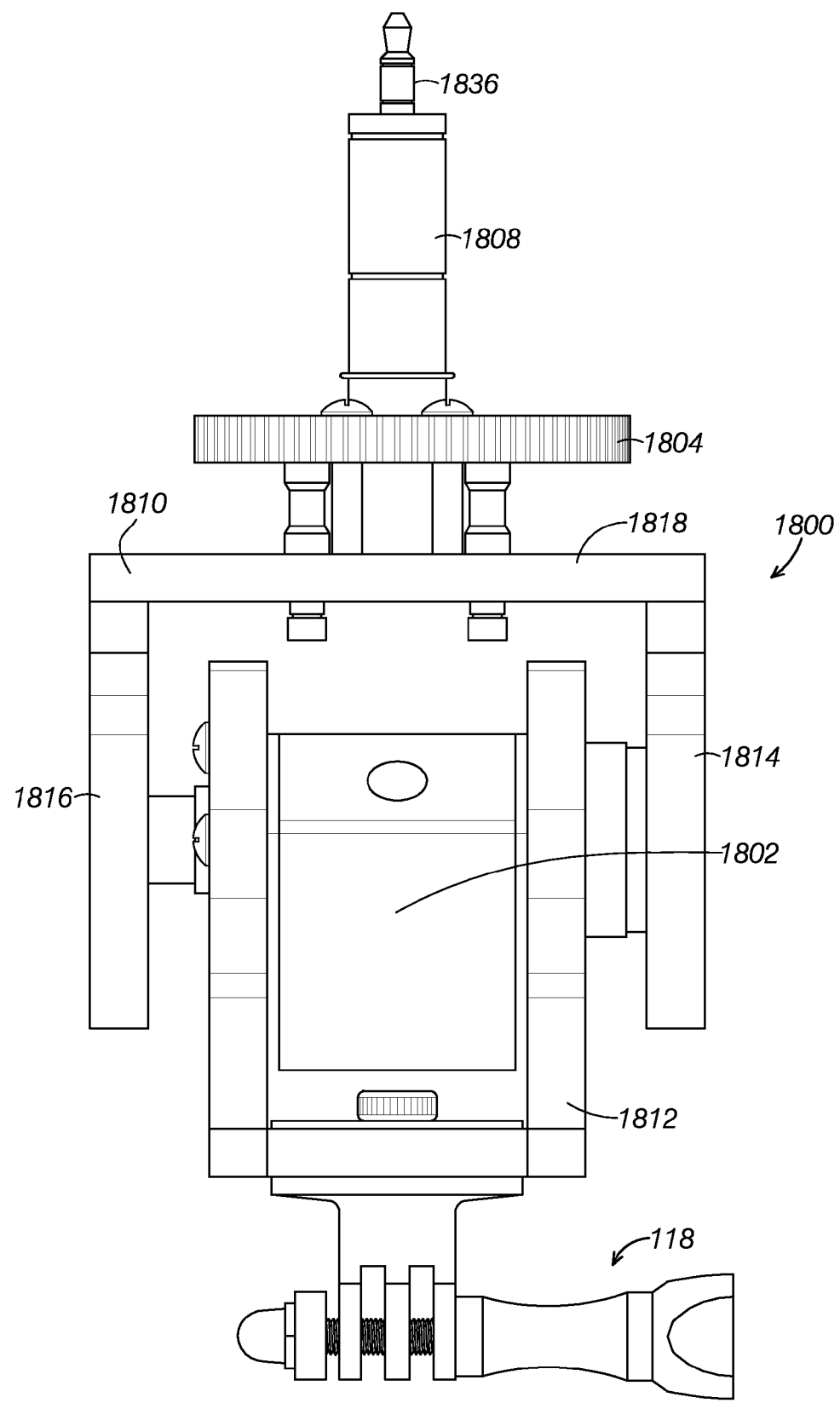
FIG. 18 is a front view of a third example pan/tilt module.

FIGS. 11-17B depict a first example pan/tilt module 1100. For illustrative purposes, pan/tilt module 1100 is shown in combination with open configuration cart 200 of cable camera system 100 in FIGS. 15A and 15B. Alternate embodiments of pan/tilt modules are shown in FIGS. 17A, 17B, and 18.

Figure 19A:
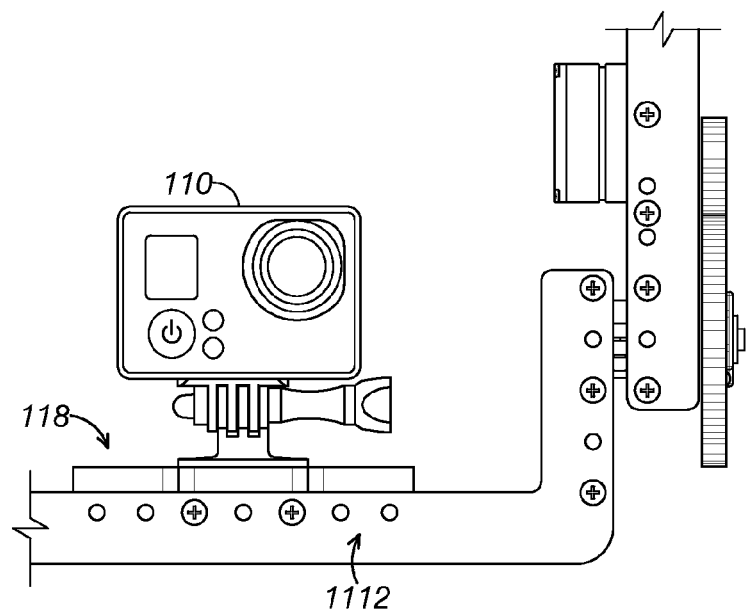
FIG. 19A is a side view of a camera attachment portion.
Figure 19B:
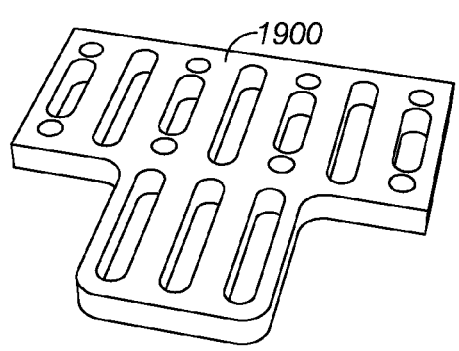
FIG. 19B is a perspective view of a camera mounting platform.
Figure 19C:
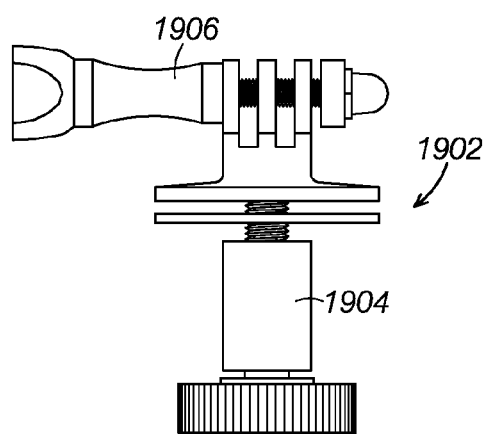
FIG. 19C is a side view of a threaded camera mounting member.

The various shown and described pan/tilt modules are configured to provide a 360° panning motion so that the camera may rotate in either a clockwise and/or counter-clockwise direction around a vertical axis of the cable camera system. The various pan/tilt modules are further configured to provide a tilting motion so that the camera can be tilted, pivoted, or extended outwardly from the cable camera system along a lateral axis of the cable camera system. FIGS. 19A-19C show a camera mounting mechanism that may be used with any of the various pan/tilt modules.

As shown in FIG. 1 and described above, cable camera system 100 includes cart module 102, motor transportation module 104, and pan/tilt module 106. Cable camera system 100 movably engaged with line 108, and movement of cable camera system 100 over the line is controlled by user 112 via remote control 114. Cart module 102, motor transportation module 104, and pan/tilt module 106 can be releasably attached to each other by various attachment members (described in more detail below).

Remote control 114 is in radio communication with motor transportation module 104 via radio signals sent from a remote control antennae 124 to a motor transportation module antennae 126. User 112 can control the forward and backward motion of the cable camera system over the line via a first column control 120 and panning and tilting of the pan/tilt module via a second column control 122.

It will be appreciated that in alternate embodiments the cable camera system may be controlled by a remote control with a different configuration (e.g., using dials instead of column controls) and/or the cable camera system may be controlled via a computer. It will be further appreciated that, when controlled by a computer, the cable camera system may be controlled with live controls and/or the movement may be pre-programmed (i.e., a desired movement pattern that is programmable). It will be still further appreciated that that directed movement may be communicated by any desired wireless communication technique (e.g., blue tooth, infrared, electromagnetic, WiFi, etc.).

Line 108 is a suspension line configured to be secured on either end of the line at a desired height and inclination. Line 108 is preferably a braided Kevlar line. The braided Kevlar line is lightweight and sufficiently smooth that it allows a smooth movement of the cable camera system as it moves forward and backward over the line in order to provide a smooth video capture. Further, the braided Kevlar line is sufficiently durable that it is resistant to burning and breaking during use. It will be appreciated that line 108 can be any type of line or cord that is sufficiently lightweight, smooth, and durable. For example, in alternate embodiments for a cable camera system, the line may be comprised of one or a combination of polypropylene, nylon, steel, plastic, etc.

A camera 110 and microphone 116 are releasably attached to pan/tilt module 106. A camera mounting mechanism 118 is configured to attach the camera to the pant/tilt module (described and shown in greater detail in FIGS. 19A-19C). As depicted, cable camera system 100 includes a small and lightweight video capable camera, such as a GoPro® video camera. It will be appreciated that the cable camera system can be used in combination with any camera that is sufficiently small enough to fit within the dimensions of the pan/tilt module and sufficiently lightweight enough to be supported by the cable camera system and the line.

Figure 2A:
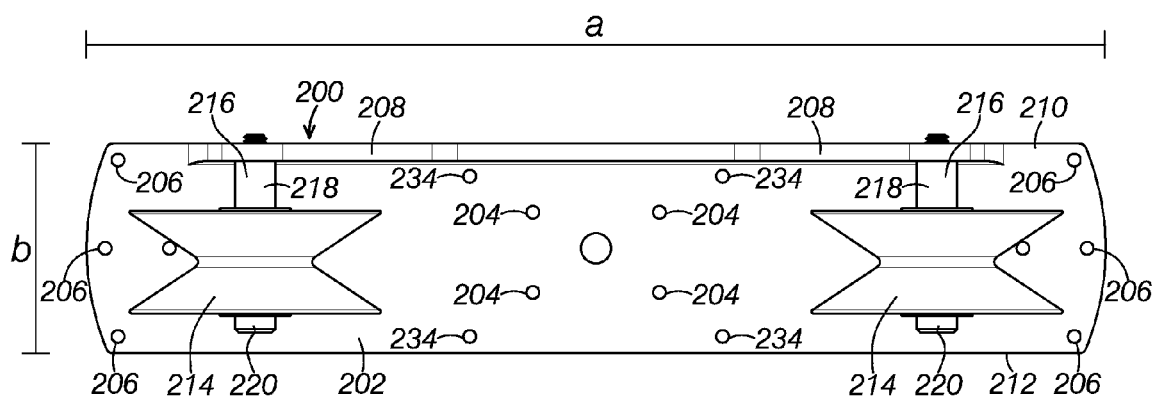
FIGS. 2A and 2B are top and side views, respectively, of an open configuration cart for the cable camera system shown in FIG. 1.
Figure 2B:
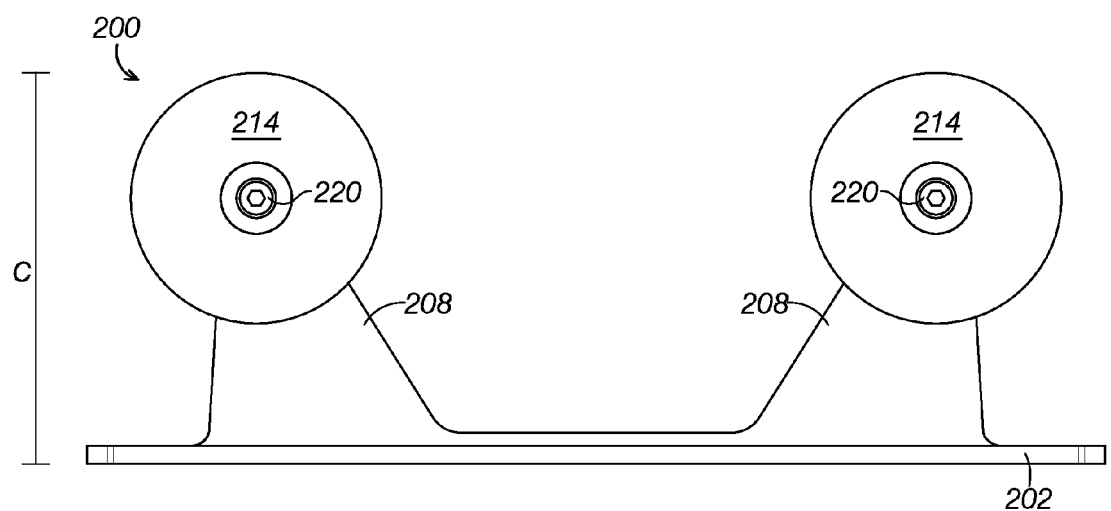

Turning now to FIGS. 2A and 2B, open configuration cart 200 (a first configuration for cart module 102) is depicted from a top view and a side view, respectively. Open configuration cart 200 includes a floor 202 with a plurality of gear box attachment holes 204, a plurality of fly wheel assembly attachment holes 234, and a plurality of bumper attachment holes 206. Two vertically extended arms 208 extend upward from a first longitudinal edge 210 of floor 202.

An open configuration cart wheel 214 is rotatably attached to distal ends of each of arms 208. Each cart wheel 214 is rotatable around an axle 216. A lateral position of each cart wheel 214 is maintained by a spacer 218. A fastening member 220 is attached at an opposing end of each axle 216 relative to arm 208. The fastening member can be any suitable member for attachment (e.g., a screw, a bolt, etc.).

Open configuration cart 200 has a length a and a width b. In one specific example, a is 8 in and b is 1⅝ in. Further, open configuration cart 200 has an overall height c (from a bottom of cart floor 202 to a top of cart wheels 214). In one specific example, the height c is 3 7/16 in.

Figure 3A:
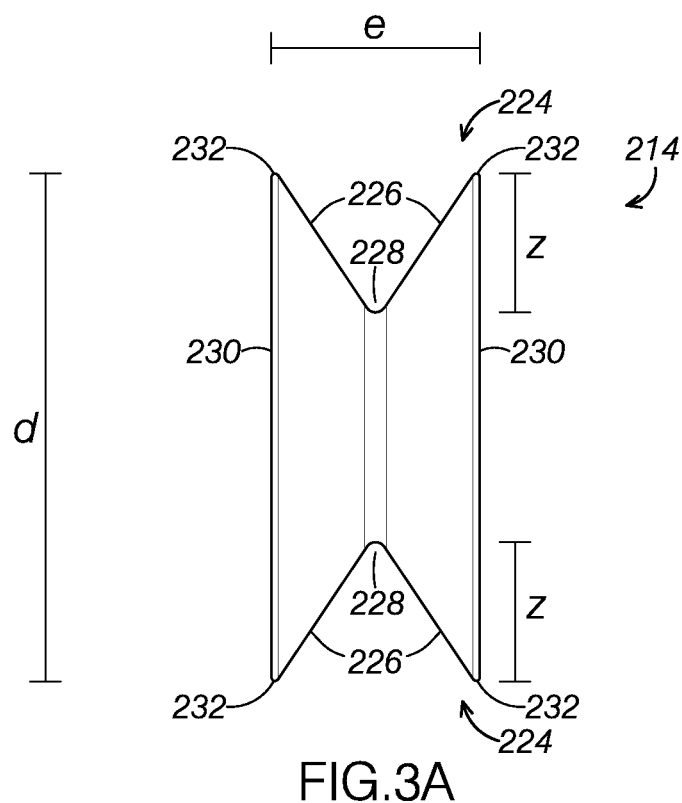
FIGS. 3A and 3B are top and side views, respectively, of a cart wheel of the open configuration cart shown in FIGS. 2A and 2B.
Figure 3B:
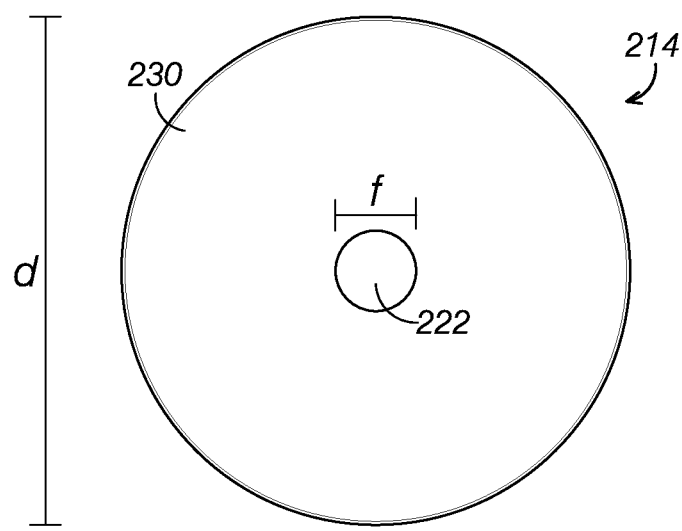

More detailed views of the configuration for the wheel of the open configuration cart (wheels 214) are depicted in FIGS. 3A and 3B. As shown in FIG. 3B, wheel 214 includes a central through hole 222 where axle 216 can extend through the wheel. The profile or front view of FIG. 3A shows that wheel 214 has a relatively deep central V-shaped groove 224. Inner walls 226 of V-shaped groove 224 meet at a first end to form a trough 228 of the groove. An opposing end of inner walls 226 meet outer walls 230 to form a substantially pointed intersecting edge or lip 232. Trough 228 is a location of contact with line 108 during operation of the cable camera system. The relatively deep V-shaped groove is configured to maintain a position of the line within the groove during operation.

Cart wheel 214 has a height/diameter d and a width e. In one specific example, d is 1 15/16 in and e is ¾ in. Central hole 222 has a width/diameter f. In one specific example, f is 5 mm. V-shaped groove 224 has a depth z. In one specific example, is ½ in.

Figure 8A:
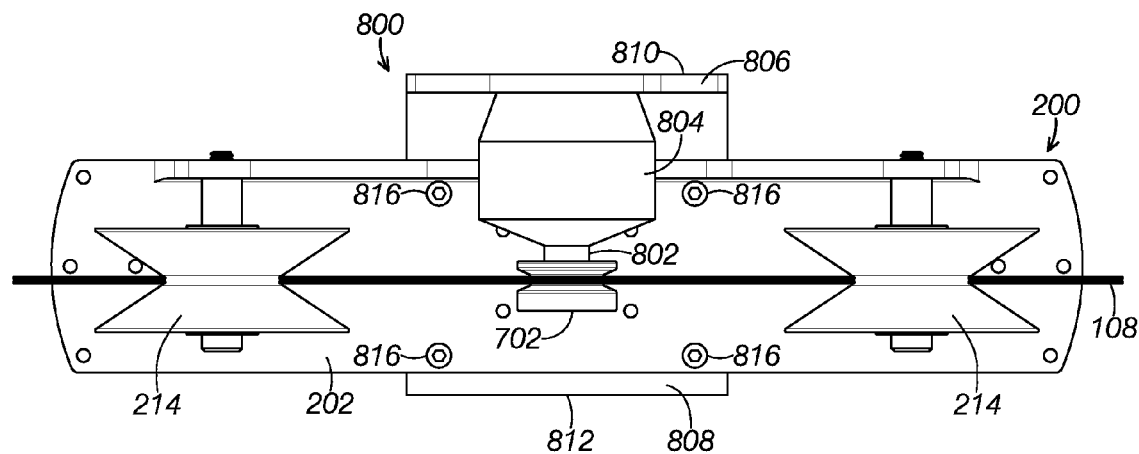
FIGS. 8A and 8B are top and side views, respectively, of the open configuration cart and the fly wheel engaged with a suspension line.
Figure 8B:
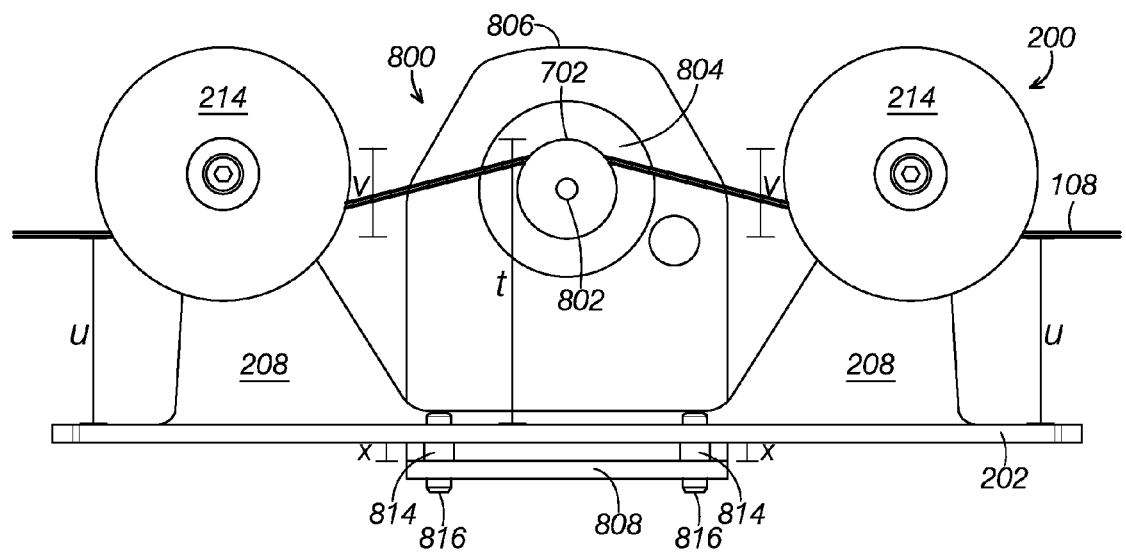

Returning to FIGS. 2A and 2B, an opposing longitudinal edge relative to first longitudinal edge 210, second longitudinal edge 212, is substantially open. Because the second longitudinal edge is open, the open configuration cart can be engaged with the line simply by setting the wheels above the line and hooking the line over a top the fly wheel (as depicted in FIGS. 8A and 8B). Thus, the open configuration cart can quickly be engaged with the line by a user using one hand.

Figure 4A:
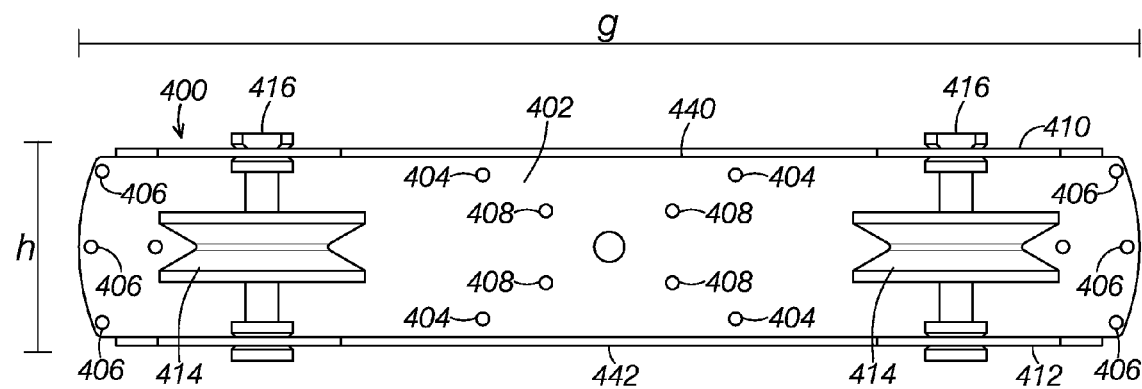
FIGS. 4A and 4B are top and side views, respectively, of a closed configuration cart for the cable camera system shown in FIG. 1.
Figure 4B:
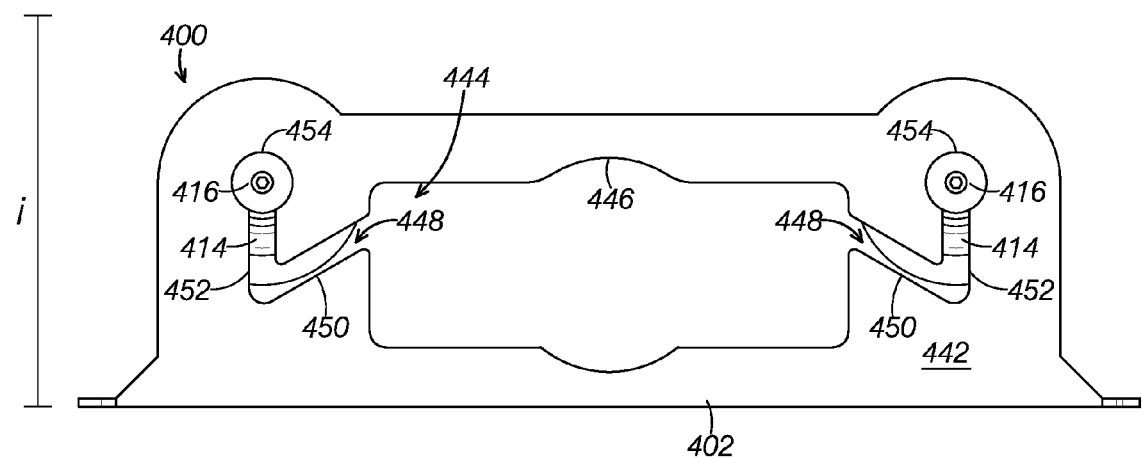

Alternatively, the cable camera system can be used with a different configuration for a cart. For example, FIGS. 4A and 4B are a top view and a side view, respectively, depicting closed configuration cart 400 (a second configuration for cart module 102). Closed configuration cart 400 includes a floor 402 with a plurality of fly wheel assembly attachment holes 404, a plurality of gear box attachment holes 408, and a plurality of bumper attachment holes 406. A first vertically extended wall 440 extends upward from a first longitudinal edge 410 of floor 402. A second vertically extended wall 442 extends upward from a second longitudinal edge 412 of floor 402.

Each of walls 440 and 442 is substantially identical. The configuration of wall 442 will now be described in reference to FIG. 4B, however, it will be appreciated that the description of wall 442 is also descriptive of wall 440. As shown in FIG. 4B, wall 442 includes an opening 444. Opening 444 has a central portion 446 that is wider and has a generally circular-shaped center where a closed configuration cart wheel 414 (described in more detail below in reference to FIGS. 5A and 5B) may be inserted through.

On either side of central portion 446, opening 444 includes a narrower portion 448 that has a slot-like shape, and is continuous with central portion 446. Each of narrower portions 448 includes a downward or descending portion 450 that descends away from central portion 446 at an angle. Descending portion 450 is continuous with a vertical portion 452 that extends upward from a distal end of descending portion 450. An axle 416 (described in more detail below in reference to FIG. 6), on which wheel 414 is rotatably attached, is insertable through narrower portion 448.

Closed configuration cart 400 has a length g and a width h. In one specific example, g is 8½ in and h is 1 11/16 in. Further, closed configuration cart 400 has an overall height i (from a bottom of cart floor 402 to a top of vertical walls 440 and 442). In one specific example, the height i is 3¼ in.

It will be appreciated that the overall dimensions of closed configuration cart 400 are substantially similar to open configuration cart 200. Thus, the closed configuration cart and the open configuration cart are easily interchangeable and can be used selectively and/or alternately used with the motor transportation module and the pan/tilt module. In an alternate embodiment, the closed configuration cart and the open configuration cart may have substantially different overall dimensions.

Functionally, for engagement of the closed configuration cart with the line, a user brings cart 400 into a position underneath line 108, where line 108 is below opening 444. Next, wheel 414 (fixedly attached to axle 416) is inserted through central portion 446 of opening 444. Axle 414 is inserted through narrower distal portion 448, first through descending portion 450 and then through vertical portion 452. Axle 414 lastly comes to abut the distal end of vertical portion 452, an axle supporting wall 454.

This insertion process is repeated for both of the wheels 414 and axles 416. Opposing ends of axles 416 are concurrently engaged with opposing vertical walls 410 and 412. When the wheels are axles are in a desired position, the cart is released by the user and the line engages with an underside of wheels 414 (the line is also hooked over a top of the fly wheel similarly as is shown in FIGS. 8A and 8B with the open configuration cart). Consequently, the closed configuration cart substantially encompasses or captures the line between floor 402, vertical walls 410 and 412, and wheels 414. Thus, the cart is securely attached to the line even when used in windy or fast-paced movement conditions.

Figure 5A:
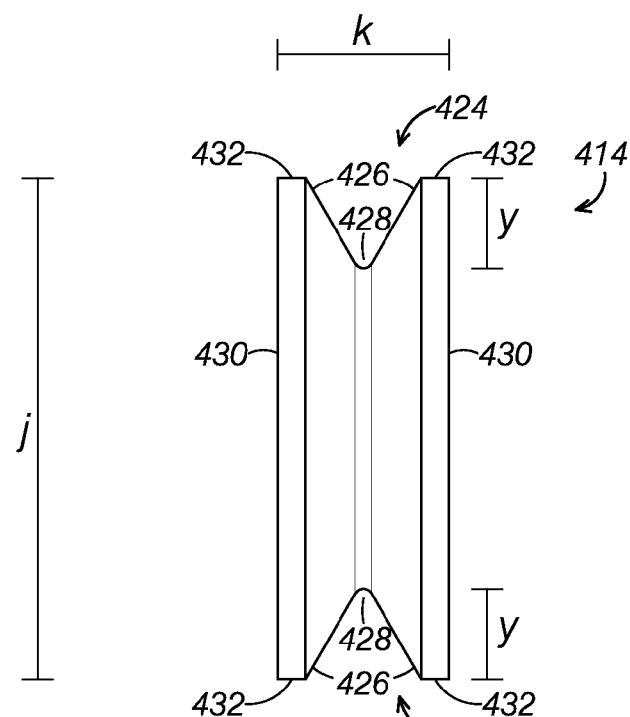
FIGS. 5A and 5B are top and side views, respectively, of a cart wheel of the closed configuration cart shown in FIGS. 4A and 4B.
Figure 5B:
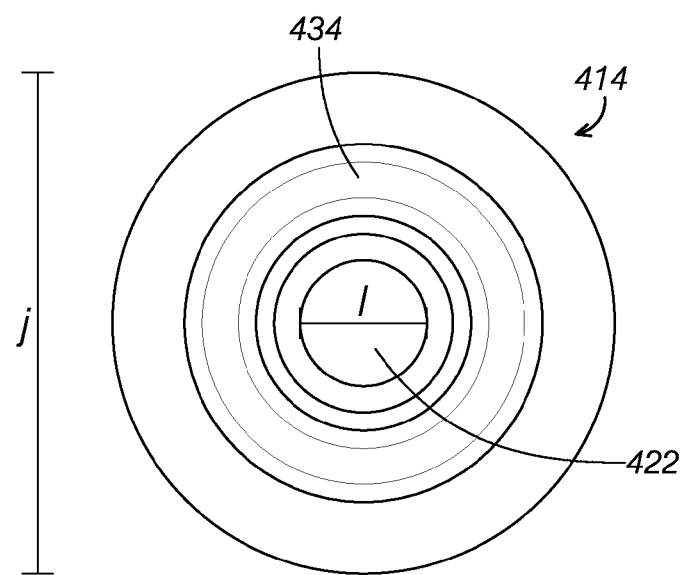
Figure 6:
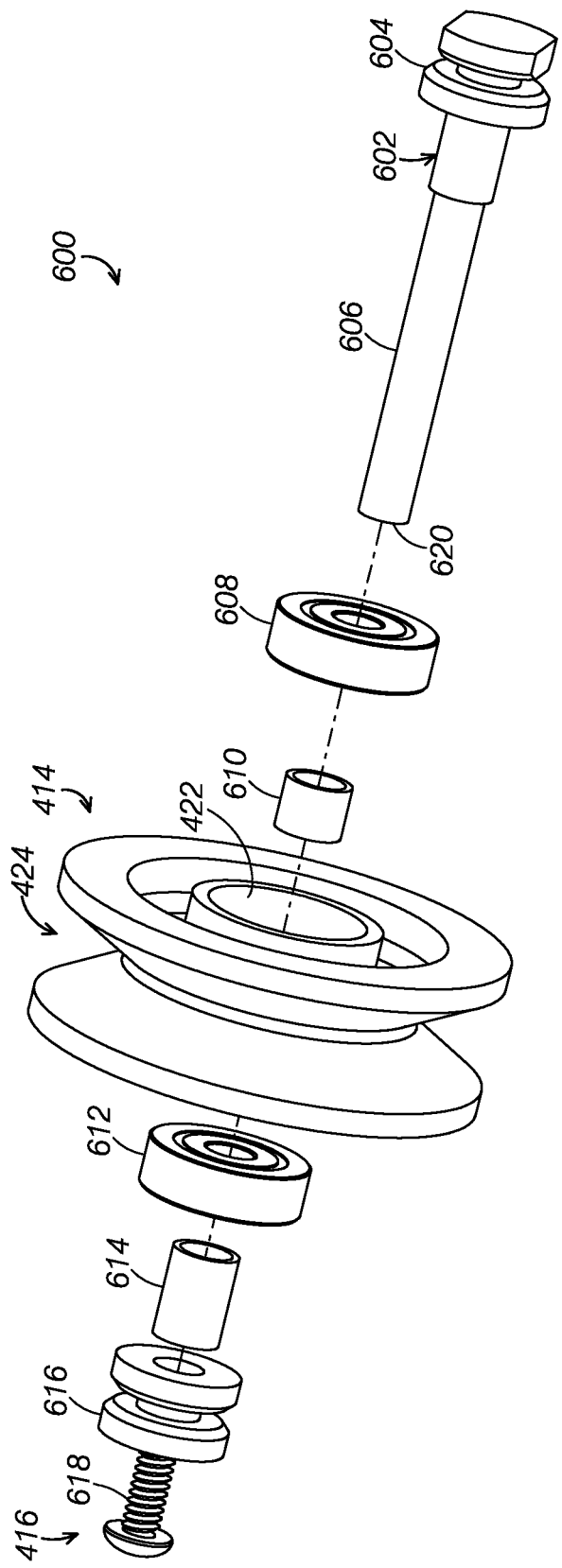
FIG. 6 is an exploded view of the cross-pin mechanism of the wheel in the closed configuration cart.

FIGS. 5A, 5B, and 6 show detailed views of the configuration for the wheel of the closed configuration cart (wheels 414). As shown in FIG. 5B, wheel 414 includes a central through hole 422 where axle 416 can extend through the wheel. A surface of outer walls 430 includes a concentric groove 434 that is concentric relative to central hole 422 (also shown in FIG. 6). The profile or front view of FIG. 5A shows that wheel 414 has a relatively shallow central V-shaped groove 424. Inner walls 426 of V-shaped groove 424 meet at a first end to form a trough 428 of the groove. An opposing end of inner walls 426 meet outer walls 430 to form a substantially flat intersecting edge or lip 432. Trough 428 is a location of contact with line 108.

Cart wheel 414 has a height/diameter j and a width k. In one specific example, j is 1¾ in and k is ⅝ in. Central hole 422 has a width/diameter l. In one specific example, j is 5 mm. V-shaped groove 424 has a depth y. In one specific example, y is 5/16 in. It will be appreciated that the overall dimensions of the closed configuration cart wheels are substantially smaller than the open configuration cart wheels. In an alternate embodiments, the closed configuration cart wheels may be substantially the same or larger in size than the open configuration cart wheels.

FIG. 6 shows an exploded view of a wheel and axle assembly (a cross-pin assembly) 600 for closed configuration cart 400. Assembly 600 includes a bolt 602 with a wall engagement bearing head 604 (for engagement with one of the vertical walls) and a shaft 606 (for insertion through the other assembly components). Shaft 606 is inserted through a first wheel ball bearing 608, a first spacer 610, wheel 414, a second wheel ball bearing 612, a second spacer 614, and a free-wall engagement bearing 616. A fixing member 618 (e.g., a screw or a bolt) is fastened within an open end 620 of shaft 606 in order to maintain a position of the assembly components. It will be appreciated that the wheel and axle assembly can have any configuration that allows for the cart wheel to be rotatably mounted on the axle, and that allows the ends of the axle to make contact with and be secured within openings of the closed configuration cart vertical walls.

Either of the above described carts, open configuration cart 200 and closed configuration cart 400, can be releasably mounted to motor transportation module 104 and engaged with line 108. As stated above, a fly wheel is drivingly and rotatably coupled to motor transportation module 104 for driving forward and backward movement of cable camera assembly 100 over line 108. FIGS. 7A and 7B show side and front or profile views, respectively, of a larger fly wheel 702 and a smaller fly wheel 704.

Larger fly wheel 702 has a height/diameter m, while smaller fly wheel 704 has a height/diameter n. The distance m is greater than the distance n. In one specific example, m is 21 mm and n is 14 mm. Larger fly wheel has a central hole 706 and smaller fly wheel 704 has a central hole 708. Each of central holes 706 and 708 has a width/diameter o and a length p, and therefore either of the larger fly wheel and the smaller fly wheel can be alternately used with (attached to) the same fly wheel column, such as fly wheel column 802 shown in FIGS. 8A and 8B. In one specific example, o is 4 mm and p is 10 mm.

The profile or front view of FIG. 7B shows that fly wheel 702 has a U-shaped groove 710 with a depth s. In one example, the depth s is 3 mm. One end of inner walls 714 of U-shaped groove 710 meet at a floor 712 of the groove. Floor 712 is a location of contact with the line.

An opposing end of inner walls 714 meet outer walls 716 and 718 to form a substantially flat intersecting edges or lips 720 and 722, respectively. Intersecting edge 722 has a length q, while intersecting edge 720 has a length r. This distance q is greater than the distance r. In one specific example, q is 4.5 mm and r is 2 mm.

A U-shaped groove 724 has substantially the same configuration and dimensions as U-shaped groove 710, and thus will not be redundantly described. Because U-shaped grooves 710 and 724 have substantially the same configuration, they can be alternately used with (attached to) the same fly wheel column and be aligned with the wheels of the associated cart module, such as cart wheels 214 shown in FIGS. 8A and 8B.

FIGS. 8A and 8B depict fly wheel assembly 800 (a portion of motor transportation module 104) releasably coupled to open configuration cart 200 and engaged with line 108. Fly wheel assembly 800 includes fly wheel 702, fly wheel column 802, and a fly wheel motor 804 mounted to a vertical wall 806. Vertical wall 806 is extended upward from a first longitudinal edge 810 of base plate 808. Base plate 808 is releasably attached to cart floor 202 via attachment members 816 (disposed in holes 234 shown in FIG. 2A). Attachment members 816 are inserted through spacers 814, which have a height x.

FIGS. 8A and 8B further depict a relationship between the fly wheel, the cart module, and the line. The top view of FIG. 8A shows that fly wheel 702 and cart wheels 214 are aligned in a lateral direction. Specifically, grooves 224 and 710 are positioned such that line 108 is laterally aligned along the longitudinal path of cable camera system 100. The side view of FIG. 8A shows that although line 108 is laterally aligned through fly wheel 702 and cart wheels 214, the longitudinal path of line 108 is not vertically aligned through fly wheel 702 and cart wheels 214.

Line 108 passes below cart wheels 214 and above fly wheel 702. The longitudinal path of line 108 has a vertical height t where the line passes over fly wheel 702 and a vertical height u where it passes below cart wheels 214. The height t is greater than the height u. In one specific example, t is 2¼ in and u is 1⅝ in.

A difference between the heights t and a is a change in height v (an incline and/or a decline height of the line longitudinal path). In one specific example the change in height v is 9/16 in.

The change in height v can be varied in order to decrease and/or increase a tension/friction of line 108. Increase of the change in height v increases a tension/friction of the line. Decrease of the change in height v decreases a tension/friction of the line.

The change in height v can be increased and decreased by a variety of methods. In one example, the height x of spacers 814 can be increased to increase v and decreased to decrease v. In a second example, smaller fly wheel 704 can be used to decrease v. In a third example, a fly wheel larger than fly wheel 702 can be used in increase v. In a fourth example, larger cart wheels can be used to increase v and smaller cart wheels can be used to decrease v. It will be appreciated that the speed capacity of the cable camera system may be adjusted by any method for changing the distance v.

For illustrative purposes, FIGS. 8A and 8B show larger fly wheel 702 mounted to fly wheel column 802. Also for illustrative purposes, fly wheel assembly 800 and line 108 are shown in combination with open configuration cart 200. It will be appreciated that fly wheel 704 and/or closed configuration cart 400 can alternately and/or selectively be associated with fly wheel assembly 800 and line 108.

Turning now to FIGS. 9 and 10, electrical components 900 of motor transportation module 104 are depicted. Electrical components 900 include a battery 902 battery cables 904, an electronic speed controller (ESC) 906, a transceiver 908, motor power cables (910/928, 911, and 912), and antennae 126. Motor power cables 910 provide power and signals to the pan motor, motor power cables 928 provide power and signals to the tilt motor, motor power cables 911 provide power to and receives signals from the transceiver, and motor power cables 912 provide power and signals to the fly wheel motor.

Battery 902 is releasably attached to a battery platform 914. Battery 902 is preferably a lithium polymer battery, but can be any light weight battery capable of powering cable camera system 100. Battery platform 914 is fixed to a lower surface of fly wheel assembly 800 and includes an upper attachment surface 916 and a lower attachment surface 918. FIGS. 9 and 10 show a single battery, battery 902, attached to lower attachment surface 918, however, it will be appreciated that a second battery can be attached to upper attachment surface 916.

In the present example, each of attachment surfaces 916 and 918 includes an attachment material, such as a plastic hook material, that is paired to an attachment material on the surface of a battery, such as a plastic loop material. It will be appreciated that in alternate embodiments a battery can be attached by a different pairing mechanism, such as by a slide-fit attachment pair, a snap-fit attachment pair, etc.

Battery 902 is electrically coupled to ESC 906 via battery cables 904 and provides power to the transceiver 908. Transceiver 908 receives signals from antennae and transmitter 126, and provides commands to ESC 906 and power and commands to the minor motors to control the less power-intensive movement actions of the cable camera system (e.g., panning, tilting, lights, etc.). ESC 906 regulates the amount and frequency of power sent to the fly wheel motor to control various more power-intensive actions of the of the cable camera system (e.g., forward and backward movement over the line, starting, breaking, etc.).

As shown in FIGS. 9 and 10, ESC 906 is electrically coupled to the fly wheel motor via motor power cable 912. ESC 906 powers the transceiver 908, which is in turn electrically coupled to the pan/tilt module motors, a panning motor 920 and a tilting motor 1102, via motor power cables 910 and 928, respectively. Panning motor 920 is mounted to a bottom side of motor transportation module 104 and is disposed within a gearbox 922. Gear box 922 is mounted to cart floor 202 via gear box attachment members 924.

Figure 12:
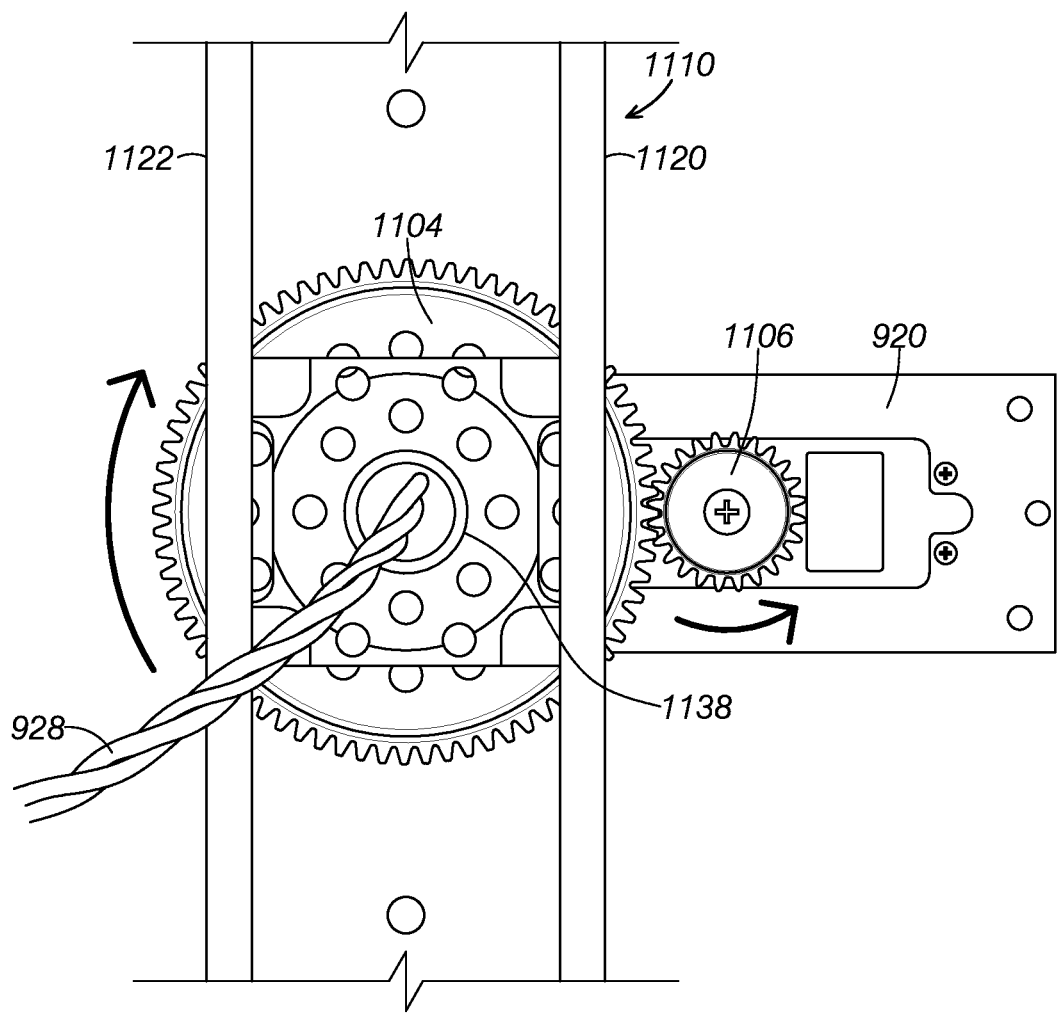
FIG. 12 is a bottom view of a portion of the motor transportation module releasably fixed to and drivingly coupled with a portion of a first pan/tilt module.
Figure 13:
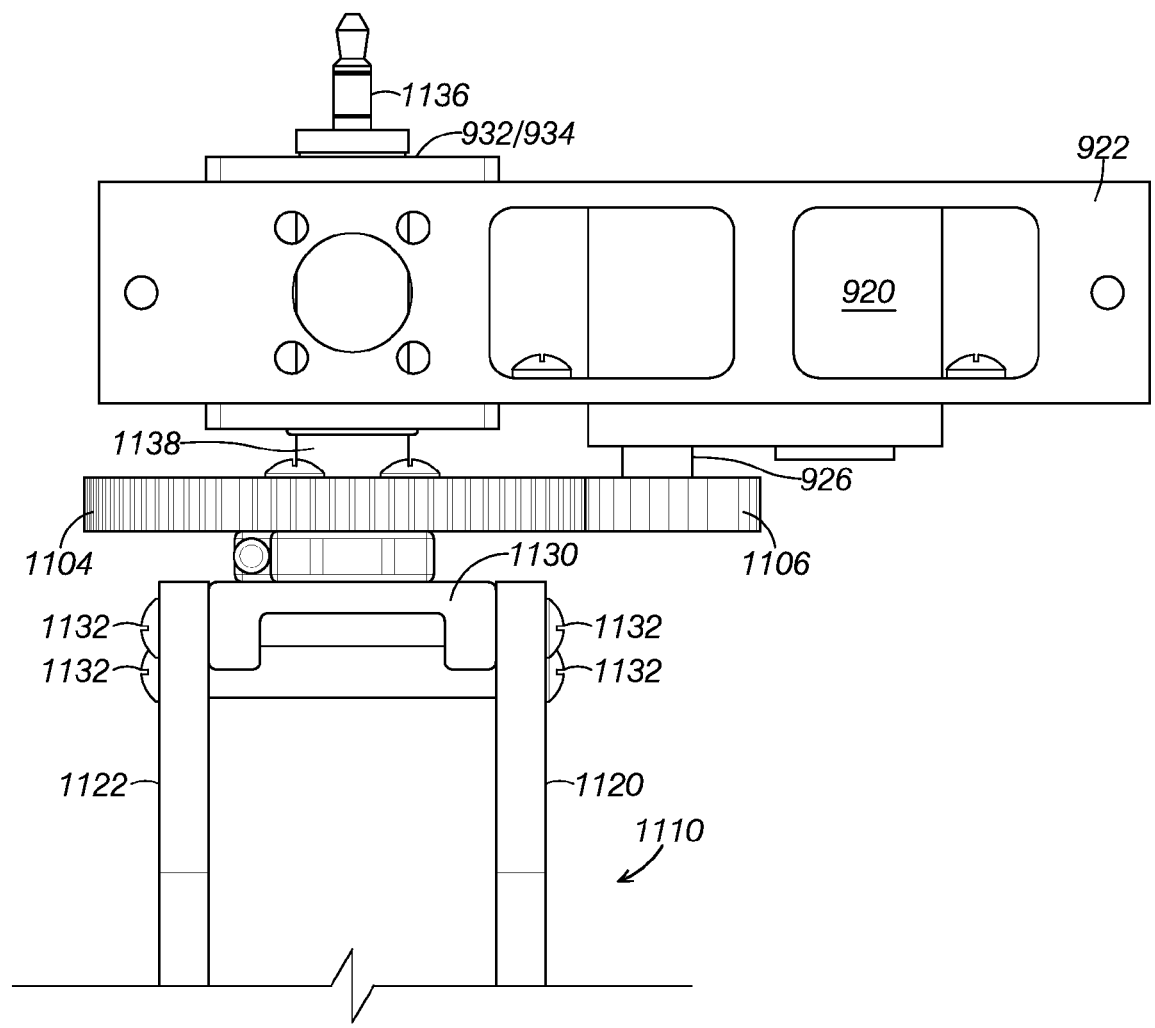
FIG. 13 is a front view of the pan motion control portion of the first example pan/tilt module of FIG. 15 releasably fixed to and drivingly coupled with the motor transportation module.
Figure 14A:
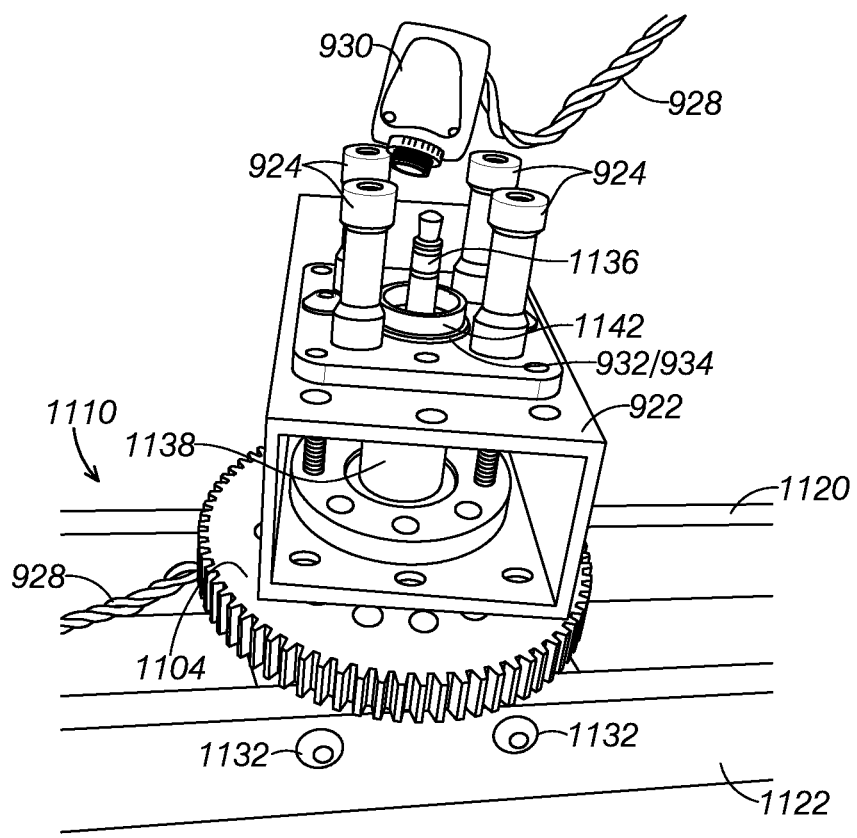
FIGS. 14A and 14B are perspective views of the power coupling between the motor transportation module and the first pan/tilt module shown with and without an outer mounting bracket, respectively.
Figure 14B:
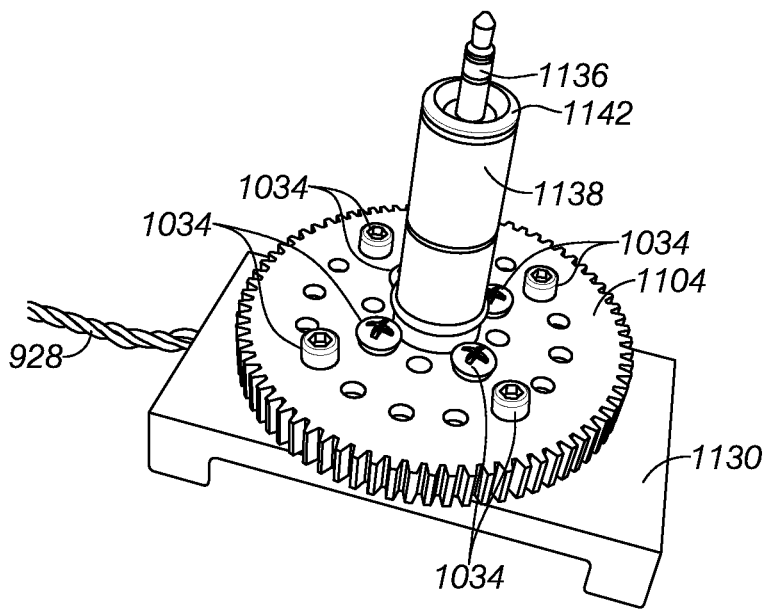

A gear shaft 926 drivingly couples motor 920 to a smaller pan gear 1106. As shown in FIGS. 12 and 13, smaller pan gear 1106 is rotatably coupled with and configured to drive rotation of larger pan gear 1104. Larger pan gear 1104 is fixedly attached to pan/tilt module 106/1100 and, therefore, rotation of larger pan gear 1104 drives rotation (panning) of the pan/tilt module. Smaller pan gear 1106 and larger pan gear 1104 comprise a panning gear train. It will be appreciated that the panning gear train can include more gears and/or gears of different relative sizes.

FIGS. 12, 13, 14A, and 14B show the detailed configuration of larger pan gear 1104 and surrounding components. Larger pan gear 1104 is mounted to a mounting bracket 1130 via attachment members 1134. Mounting bracket 1130 is secured to a first face member 1120 and a second face member 1122 of a panning frame 1110 via attachment members 1132.

As shown in FIG. 12, rotation of smaller pan gear 1106 in a counter-clockwise direction drives rotation of larger pan gear 1104 in a clockwise direction. Rotation of larger gear 1104 drives rotation of panning frame 1110 in a clockwise direction. It will be appreciated that, alternatively and/or selectively, clockwise movement of smaller pan gear 1106 will drive counter-clockwise rotation of larger pan gear 1104 and rotation of panning frame 1110 in a clockwise direction. Thus, a video view may be selectively panned in clockwise and/or counter-clockwise directions during video capture.

A central gear column 1138 extends upwardly from a center of larger pan gear 1104 and is inserted through a central gear box opening 932. A top lip edge 1142 of central gear column 1138 extends over and makes abutting contact with a top lip edge 934 of central open gear box opening 932. Thus, the central gear column is rotatable within the central gear box of the opening and provides the mechanism of rotatable attachment of the pan/tilt module to the motor transportation and cart modules. In one specific example, the central gear column rides on a set of ball bearings that have a light grease or oil. In other examples, the central gear column may have another anti-friction material that allows rotation within the gear box opening.

Audio jack plug 1136 and central gear column 1138 collectively define a rotatable electrical coupler. The rotatable electrical coupler may take other forms beyond an audio jack and an audio jack coupler. Any combination of components that enable electrical communication while the pan/tilt module is rotating may be used.

An audio jack plug 1136 projects through central gear column 1138 and is electrically coupled to tilt motor cables 928 that extend out a bottom side of larger gear 1104. An audio jack connector 930 is electrically coupled to tilt motor cables 928 (an opposing end of motor cables 928 being connected to transceiver 908). Therefore, audio jack plug 1136 and audio jack connector 1138, when engaged, are a continuous electrical connection of tilt motor cables 928. Further, the specific configuration of larger pan gear 1104 and the electrical connection between audio jack plug 1136 and audio jack connector 930 allow for continuous panning action or 360° panning action of the pan/tilt module without catching and/or winding of the tilt motor cables around the larger pan gear.

An example of panning action of the cable camera system is shown in FIGS. 15A and 15B. FIG. 15A shows pan/tilt module 106 (in this specific example, pan/tilt module 1100) in a first orientation 1500, aligned along the longitudinal axis of cable camera system 100 and parallel with line 108. FIG. 15B shows pan/tilt module 106/1100 in a second orientation 1502, aligned along the lateral axis of cable camera system 100 and perpendicular relative to line 108.

Thus, the pan/tilt module is rotatable around a vertical axis of the cable camera system and a video view may be panned in 360° during video capture. It will be appreciated that although the pan/tilt module is shown only in two orientations, that the pan/tilt module can be adjusted to any orientation around the vertical axis of the cable camera system. It will be further appreciated that a direction of panning can be selectively reversed in an opposite direction during operation (in either clockwise or counter-clockwise directions).

Turning now to FIGS. 11, 15A, 15B, 16, 17A, and 17B, a specific configuration for a pan/tilt module, first example pan/tilt module 1100 is shown and described. Pan/tilt module 1100 includes panning frame 1110 rotatably and releasably attached to (or attachable with) motor transportation module 104 via gear box 922 (as described above). Panning frame 1110 has a top portion 1118 and two downward extended arms 1114 and 1116. A tilting frame 1112 is pivotably attached at distal ends of downward extended arms 1114 and 1116. Panning frame 1110 and tilting frame 1112 substantially form an overall rectangular shape. As shown in FIGS. 12, 13, 15B, and 16 each of panning frame 1110 and tilting frame 1112 include a first face member and a second face member joined by a plurality of attachment members 1128 (i.e., first face member 1120 and second face member 1122 of panning frame 1110, and first face member 1124 and second face member 1126 of tilting frame 1112).

Tilt motor 1102 is mounted on an inner surface of arm 1116 (inside of the generally rectangular shape of the pan/tilt module). A smaller tilt gear 1144 and a larger tilt gear 1146 are mounted on an outer surface of arm 1116. Tilt motor 1102 is configured to drive rotation of smaller tilt gear 1144, while smaller tilt gear 1144 is configured to drive rotation of larger tilt gear 1146. Larger tilt gear 1146 is coupled to and is configured to drive pivot of tilting frame 1112. Smaller tilt gear 1144 and larger tilt gear 1146 comprise a tilting gear train.

It will be appreciated that the tilting gear train can include more gears and/or gears of different relative sizes. It will be further appreciated that a counter weight (not specifically shown) can be attached to a side of the frame opposing the tilt motor and the tilting gear train. In one example, the counter weight is a plurality of washers mounted around one of the attachment members 1128. In other examples, the counter weight can be lighting systems, additional camera equipment (e.g., flashes, microphones, batteries, etc.), mirrored tilt drives, cart autopilot/safety stops electronics and sensors, etc.

As shown in FIG. 16, rotation of smaller tilt gear 1144 in a counter-clockwise direction drives rotation of larger tilt gear 1146 in a clockwise direction. Rotation of larger tilt gear 1146 drives pivot of tilting frame 1112 in a first lateral direction relative to pan/tilt module 1100. It will be appreciated that, alternatively and/or selectively, clockwise movement of smaller tilt gear 1144 will drive counter-clockwise rotation of larger tilt gear 1146 and pivot of tilting frame 1112 in a second lateral direction relative to pan/tilt module 1100. Thus, a video view may be tilted upward or downward during video capture.

FIGS. 17A and 17B show a second example pan/tilt module 1700. Pan/tilt module 1700 includes many similar or identical features to pan/tilt module 1100. Thus, for the sake of brevity, each feature of pan/tilt module 1700 will not be redundantly explained. Rather, key distinctions between pan/tilt module 1700 and pan/tilt module 1100 will be described in detail and the reader should reference the discussion above for features substantially similar between the two pan/tilt modules.

Pan/tilt module 1700 includes a panning frame 1710 with a top portion 1718 and two downward extended arms 1714 and 1716. A tilting frame 1712 is pivotably attached to distal ends of arms 1714 and 1716. Panning frame 1710 and tilting frame 1712 substantially form an overall rectangular shape. Each of panning frame 1710 and tilting frame 1712 has a first face member and a second face member joined by a plurality of attachment members 1728 (i.e., first face member 1720 and second face member 1722 of panning frame 1710, and first face member 1724 and second face member 1726 of tilting frame 1712).

Pan/tilt module 1700 is attached to a larger pan gear 1704. Larger panning gear 1704 includes a gear column 1708 and an audio jack plug 1736. Thus, pan/tilt module 1700 can be connected to a motor transportation module and a cart in substantially the same manner as pan/tilt module 1100. Further, panning action is driven by and occurs in substantially the same manner as pan/tilt module 1100.

Contrastingly to pan/tilt module 1100, pant/tilt module 1700 includes two tilt motors 1702a and 1702b configured to drive rotation of two panning gear trains, the first being smaller pan gear 1744a and larger pan gear 1746b and the second being smaller pan gear 1744b and 1743b. Also contrastingly to pan/tilt module 1100, pan motors 1702a and 1702b are mounted to an outer surface of arms 1716 and 1714 (outside of the generally rectangular shape of the pan/tilt module). The smaller pan gears 1744a and 1744b are drivingly connected to their corresponding pan motor on an inner surface of arms 1716 and 1714, and each is configured to drive rotation of one of the larger panning gears 1746a and 1746b, respectively.

Larger tilt gears 1746a and 1746b are coupled to and configured to drive pivot of tilting frame 1712 in order to tilt a camera in either of a first lateral direction or a second lateral direction relative to the pan/tilt module. It will be appreciated that the motors can be operated in tandem in order to provide greater power and finer control over tilting action. Because opposing tilting motors and gears balance each other, a counter weight may not be included in pan/tilt module 1700. It will be further appreciated that the tilt motor power cord 928 can be split to in order to be configured to provide power to each of the tilt motors.

In alternate embodiments for a pan/tilt module, tilting motors can be mounted to the outer surface of the frame, while the gear trains are mounted to the outer surface of the frame (similar to pan/tilt module 1100). Further, in other alternate embodiments, one tilt motor can be mounted to an inner surface and the corresponding gear train mounted to the outer surface, while a second tilt motor is mounted to an outer surface and the corresponding gear trains is mounted to the inner surface. Furthermore, the tilt gear trains may be eliminated and one or more tilt motors can be mounted on an outer surface of the panning frame and directly coupled to and configured to drive pivot of the tilting frame.

FIG. 18 shows a third example pan/tilt module 1800. Pan/tilt module 1800 includes many similar or identical features to pan/tilt modules 1100 and 1700. Thus, for the sake of brevity, each feature of pan/tilt module 1800 will not be redundantly explained. Rather, key distinctions between pan/tilt module 1800 and pan/tilt modules 1100 and 1700 will be described in detail and the reader should reference the discussion above for features substantially similar between the two pan/tilt modules.

Pan/tilt module 1800 includes a panning frame 1810 with a top portion 1818 and two downward extended arms 1814 and 1816. A tilting frame 1812 is pivotably attached to distal ends of arms 1814 and 1816. Pan/tilt module 1800 is attached to a larger pan gear 1804. Larger panning gear 1804 includes a gear column 1808 and an audio jack plug 1836. Thus, pan/tilt module 1800 can be connected to a motor transportation module and a cart in substantially the same manner as pan/tilt modules 1100 and 1700. Further, panning action is driven by and occurs in substantially the same manner as pan/tilt modules 1100 and 1700.

Contrastingly to pan/tilt modules 1100 and 1700, panning frame 1810 and tilting frame 1812 include only a single face member and have an overall decreased size profile. Further, a tilt motor 1802 is mounted to a center of tilting frame 1812 and further fixed to arm 1814. Tilt motor 1802 is configured to drive pivot of tilting frame 1812 in either of a first lateral direction or a second lateral direction relative to the pan/tilt module. In alternate embodiments for a pan/tilt module, the tilt motor can be mounted to the outer surface of the pan frame, can include a gear train configured to drive pivot of the tilt frame, and/or can include a counter weight.

Pan/tilt modules 1100 and 1700 have the advantage that because of the configuration of the panning frame and the tilting frame, a center of gravity for the cable camera system does not change during tilting and the video capture quality is smoother. Pan/tilt module 1100 has the advantage that only a single tilt motor and tilt gear train are used so there is a decreased cost for components. Pan/tilt module 1700 has the advantage that the multiple tilt motors and tilt gear trains provide finer control and faster response rate for the tilting action. Pan/tilt module 1800 has the advantage of decreased components and cost, as well as decreased overall size.

Turning now to FIGS. 19A-19C, an example camera attachment mechanism is shown and described. As shown and described above in reference to FIG. 1, camera 110 is releasably attached to pan/tilt module 106. Camera mounting mechanism 118 is configured to attach camera 110 to the pant/tilt module. Camera mounting mechanism 118 includes a mounting platform 1900 that is attached to a tilting frame, such as tilting frame 1112. Mounting platform 1900 is configured to provide a location of releasable attachment for a threaded camera attachment assembly 1902. Threaded camera attachment assembly 1902 includes a lower portion 1904 that can be attached to mounting platform 1900 and an upper portion that can be attached to camera 110. It will be appreciated that the camera attachment mechanism can be of any configuration suitable for attachment of a camera to the tilting frame.

It will be appreciated that the cable camera system can include additional features. For example, LED lights can be added to the panning frame and/or the tilting frame so an orientation of the camera can be easily observed by a user from a distance. In another example, split plastic tubing can be mounted to longitudinal ends of the cart (at bumper attachment holes 206/406) to protect the ends from being damaged or causing damage should the cart impact an object at an end of the line. In yet another example, relay switches can be added to the motor transportation module to allow automatic control of the movement of the cable camera system. Further, the cable camera system can include a complete autopilot system that can be programmed by a user. Furthermore, cart stabilization equipment can be added. Further still, equipment for real-time viewing of camera output and cart driven actuation of camera controls (for example, if a camera does not come with any or only partial remote control options) can be added.

Cable camera system 100, as described above, has the general advantages of being easy to set up, being easy to use, and being relatively inexpensive. Further, because cable camera system is modular (i.e., the motor transportation module can be used with various configurations for a cart module and various configurations for a pan/tilt module) a user may select the modular components that are best suited for the specific video capture conditions and/or skill of the user. Additionally, the modular components may be used in any desired combination (e.g., a camera can be used with the cart on a line alone, a cart and a motor transportation module can be used with a camera, etc.).

In one example of use of the example cable camera system described above, a user first attaches the line to a first support at one end and a second support at a second end. The user then selects and assembles the desired modular components for a camera transport device, including at least one motor transportation module, one cart module, and one pan/tilt module. A camera is attached to the pan/tilt module. The assembled camera transport device is then engaged with the line by either of the methods described above for the open configuration cart and the closed configuration cart. In general, the cart wheels are engaged over the line, while the fly wheel is engaged under the line.

The camera, the remote control, and the motor transportation module are powered on and the camera transport device is centered on the line. The system can be set to either of a sport mode (higher speed capacity) or a drama mode (lower speed capacity). The user then controls desired forward and backward movement over the line, and panning and tilting actions of the pan/tilt module via the remote control. Optionally, the cable camera system can be controlled in an autopilot mode using relay switches or movement can be pre-programmed using a computer system.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:
1. A camera transport device for movingly supporting a camera from a suspension line, comprising:
   a cart module releasably engaged with a line, the cart module having at least two cart wheels engaged with the line, the at least two cart wheels disposed over the line;
   a motor transportation module having at least one fly wheel engaged with the line, the at least one fly wheel disposed under the line and between the at least two cart wheels, the at least one fly wheel and aligned with the at least two cart wheels, the at least one fly wheel electrically coupled to and driven by a first motor;

a pan/tilt module having a frame, the frame having a panning assembly and a tilting assembly, the panning assembly releasably and rotatably coupled to a bottom side of the cart and the tilting assembly pivotably coupled to a lower portion of the panning assembly; and at least one gear train drivingly connected to the motor transportation module, the at least one gear train configured to rotate the panning assembly around a vertical axis of the frame and pivot the tilting assembly around in a first lateral direction and a second lateral direction relative to the frame, wherein rotating the panning assembly provides a panning effect during operation of the camera and pivoting the tilting assembly provides a tilting effect during operation of the camera, wherein the cart module is an open configuration cart module configured to provide an unrestricted path for the line to engage with the cart wheels, the open configuration cart module comprising a base and at least two vertically extending arms, the at least two vertically extending arms aligned parallel to a cart longitudinal axis at a first longitudinal edge of the open configuration cart module, the at least two cart wheels rotatably attached at distal ends of the at least two arms relative to the base, and wherein the at least two vertically extending arms are disposed between the at least two cart wheels and the motor transportation module, and a second longitudinal edge of the open configuration cart is open, the second longitudinal edge on an opposite side of the open configuration cart module relative to the first longitudinal edge.

2. The cable camera system of claim 1, wherein a cross section of each of the at least two cart wheels of the open configuration cart module comprises two intersecting interior walls that substantially form a centrally located V-shaped groove and two exterior walls on either side of the two intersecting interior walls, each of the two intersecting interior walls extended to one of the two exterior walls to form a substantially pointed intersecting edge.

3. The cable camera system of claim 1, wherein the cart module is a closed configuration cart module configured to circumvent the line by a combination of the wheels and the cart module once the line engages the wheels, the closed configuration cart module comprising a base and two vertically extending walls, the two vertically extending walls aligned parallel to a cart longitudinal axis at a first longitudinal edge and a second longitudinal edge of the closed configuration cart, the first longitudinal edge on an opposite side of the closed configuration cart relative to the second longitudinal edge, each of the two vertically extending walls having an opening, the opening having a wider portion at a central region and a narrower portion at distal ends of the walls, the at least two cart wheels of the closed configuration cart further comprising a cross pin mechanism extending through a center of each wheel, each cart wheel configured to be fitted through the wider portion and each cross pin mechanism configured to be held securely in the narrower portion, opposing ends of the cross pin engaged with the narrow portions of opposing openings of the two vertically extending walls.

4. The cable camera system of claim 3, wherein:
the wider portion of the opening is a generally circular shape, the generally circular shape having a height that is slightly larger than a diameter of the cart wheel, and the narrower portion of the opening is a slot-like shape with a first descending portion and a second vertical portion, and the cross pin mechanism comprises a bolt having a first wall engagement bearing at a head of the bolt, the bolt inserted through a first cart wheel engagement bearing, a first spacer, a second cart wheel engagement bearing, and a second spacer, and a screw screwed into a second wall engagement bearing and an open end of the bolt, the open end of the bolt on an opposite side relative to the head, the narrower portion of the opening having a height that is slightly larger than a diameter of the first and the second wall engagement bearings.

5. The cable camera system of claim 3, wherein a cross section of each of the at least two cart wheels of the closed configuration cart module comprises two intersecting interior walls that substantially form a centrally located V-shaped groove and two exterior walls on either side of the two intersecting interior walls, each of the two intersecting interior walls partially extended to one of the two exterior walls to form a substantially flat intersecting edge.

6. The cable camera system of claim 1, wherein a cross section of the fly wheel comprises two interior walls that are joined by a floor, the two interior walls and the floor substantially forming a U-shaped groove, and two exterior walls are disposed on either side of the of the interior walls, each of the interior walls partially extended to one of the two exterior wall to form a substantially flat intersection.

7. The cable camera system of claim 1, further comprising a battery electrically coupled to the motor transportation module, the battery releasably attached to a battery mounting platform, the battery mounting platform attached to the motor transportation module and the cart module, the battery mounting platform extended in an opposing lateral direction of the camera transport device relative to the first motor.

8. The cable camera system of claim 1, further comprising a second motor, the second motor coupled to a first gear of the at least one gear train, the motor configured to drive rotation of the first gear, the first gear drivingly connected to and configured to drive rotation of a second gear of the at least one gear train, the second gear coupled to a top of the panning assembly and the second gear configured to drive rotation of the panning assembly around the vertical axis of the frame.

9. The cable camera system of claim 8, further comprising a mounting bracket, the mounting bracket configured to releasably and rotatably fix the pan/tilt module to the motor transportation module and the cart module, the mounting bracket having a centrally located opening, a hollow shaft mounted a top side of the second gear inserted through the centrally located opening, an electrical cord running through the hollow shaft including an audio connector that projects out of a top end of the hollow shaft, a power connector fitted over the audio connector and configured to provide an electrical connection from the motor transportation module to a third motor electrically coupled to an opposing end of the electrical cord, coupling of the power connector and the audio connector allowing 360° rotation of the pan/tilt module around the vertical axis of the frame while maintaining electrical connection with the third motor.

10. The cable camera system of claim 9, further comprising a third gear of the at least one gear train coupled to the third motor and a fourth gear of the at least one gear train coupled to the tilt assembly, the motor configured to drive rotation of the third gear, the fourth gear drivingly connected to the third gear and configured to drive pivot of the tilt assembly in the first lateral direction and the second lateral direction relative to the frame.

11. The cable camera system of claim 9, further comprising a counter weight, the counter weight attached to an opposing side of the panning assembly relative to the third motor.

12. The cable camera system of claim 1, further comprising a camera and a camera attachment mechanism, a platform of the camera attachment mechanism fixed to the tilt assembly, a mounting screw assembly releasably fixed to the platform, the camera releasably fixed to the mounting screw assembly.

13. The cable camera system of claim 1, further comprising a remote control system in data communication with the motor transportation module, a remote control operated by a user to direct a speed and direction of movement of the camera along the suspension line, a speed and direction of panning, and a speed and direction of tilting.

14. A cable camera system for movingly supporting a camera from a suspension line, comprising:
a camera transport device releasably engaged with the line, the camera transport device being:
a cart module having at least two cart wheels engaged with the line, the at least two cart wheels disposed over the line,
a pan/tilt module having a frame, the frame having a panning assembly and a tilting assembly, the panning assembly releasably and rotatably coupled to a bottom side of the cart and the tilting assembly pivotably coupled to a lower portion of the panning assembly,
at least one gear train, the at least one gear train having a first gear attached to a bottom side of the motor transportation module, and a second gear drivingly connected to the first gear and configured to drive rotation of the panning assembly around a vertical axis of the frame,
a mounting bracket, the mounting bracket configured to releasably fix the pan/tilt module to the motor transportation module and the cart module, the mounting bracket having a centrally located opening, a hollow shaft mounted a top side of the second gear inserted through the centrally located opening, an electrical cord running through the hollow shaft including a male audio jack that projects out of a top end of the hollow shaft, and
a motor transportation module drivingly connected to the at least one gear train and having:
a battery,
at least one fly wheel disposed under the line and between the at least two cart wheels, the at least one fly wheel aligned with the at least two cart wheels,
a first motor coupled to and configured to drive rotation of the fly wheel, and
a second motor coupled to and configured to drive rotation of the first gear; and
a remote control system in data communication with the motor transportation module, a remote control operated by a user to direct a speed and direction of movement of the camera along the suspension line, a speed and direction of panning, and a speed and direction of tilting,
wherein rotation of the panning assembly provides a panning effect during operation of the camera and pivot of the tilting assembly provides a tilting effect during operation of the camera.

15. The cable camera system of claim 14, further comprising a female power connector fitted over the male audio connector and configured to provide an electrical connection from the motor transportation module to a third motor electrically coupled to an opposing end of the electrical cord, coupling of the female power connector and the male audio connector allowing 360° rotation of the pan/tilt module around a vertical axis of the frame while maintaining electrical connection with the third motor.

16. The cable camera system of claim 15, further comprising a third gear and a fourth gear of the at least one gear train, the third gear coupled to the third motor, the third motor configured to drive rotation of the third gear, the fourth gear drivingly connected to the third gear and configured to drive pivot of the tilting assembly in a first lateral direction and a second lateral direction relative to the frame.

17. The cable camera system of claim 15, wherein the electrical cord is a split electrical cord running through the hollow shaft, a first opposing end of the split electrical cord electrically coupled to the third motor, a second opposing end of the split electrical cord electrically coupled to a fourth motor, the third motor coupled to and configured to drive pivot of a first longitudinal end of the tilt assembly, the fourth motor coupled to and configured to drive pivot of a second longitudinal end of the tile assembly, the third motor and the fourth motor collectively driving pivot of the tilting assembly in a first lateral direction and a second lateral direction relative to the frame.

18. The cable camera system of claim 14, wherein the cart module is an open configuration cart module configured to provide an unrestricted path for the line to engage with the cart wheels, the open configuration cart module comprising a base and at least two vertically extending arms, the at least two vertically extending arms aligned parallel to a cart longitudinal axis at a first longitudinal edge of the open configuration cart module, the at least two cart wheels rotatably attached at distal ends of the at least two arms relative to the base.

19. The cable camera system of claim 18, wherein the at least two vertically extending arms are disposed between the at least two cart wheels and the motor transportation module, and a second longitudinal edge of the open configuration cart is open, the second longitudinal edge on an opposite side of the open configuration cart module relative to the first longitudinal edge.

20. A camera transport device for movingly supporting a camera from a suspension line, comprising:
a cart module releasably engaged with the line, the cart module having at least two cart wheels engaged with the line, the at least two cart wheels disposed over the line;
a pan/tilt module having a frame, the frame having a panning assembly and a tilting assembly, the panning assembly releasably and rotatably coupled to a bottom side of the cart and the tilting assembly pivotably coupled to a lower portion of the panning assembly;
at least one gear train, the at least one gear train having a first gear attached to a bottom side of the motor transportation module, and a second gear drivingly connected to the first gear and configured to drive rotation of the panning assembly around a vertical axis of the frame;
a motor transportation module drivingly connected to the at least one gear train and having:
a battery,
at least one fly wheel disposed under the line and between the at least two cart wheels, the at least one fly wheel aligned with the at least two cart wheels,
a first motor coupled to and configured to drive rotation of the fly wheel, and
a second motor coupled to and configured to drive rotation of the first gear;
a mounting bracket, the mounting bracket configured to releasably and rotatably fix the pan/tilt module to the motor transportation module and the cart module, the mounting bracket having a centrally located opening, a hollow shaft mounted a top side of the second gear inserted through the centrally located opening, an electrical cord running through the hollow shaft including a male audio connector that projects out of a top end of the hollow shaft, a female power connector fitted over the male audio connector and configured to provide an electrical connection from the motor transportation module to a third motor electrically coupled to an opposing end of the electrical cord, coupling of the power connector and the audio connector allowing 360° rotation of the pan/tilt module around the vertical axis of the frame while maintaining electrical connection with the third motor, the third motor coupled to and configured to drive pivot of pivot of the tilt assembly in a first lateral direction and a second lateral direction relative to the frame; and a remote control system in data communication with the motor transportation module, a remote control operated by a user to direct a speed and direction of movement of the camera along the line, a speed and direction of panning, and a speed and direction of tilting, wherein rotating the panning assembly provides a panning effect during operation of the camera and pivoting the tilting assembly provides a tilting effect during operation of the camera.

\* \* \* \* \*